United States Patent
Li et al.

(10) Patent No.: US 12,028,707 B2
(45) Date of Patent: Jul. 2, 2024

(54) APPARATUS, SYSTEM, METHOD, AND COMPUTER-READABLE MEDIUM FOR PERFORMING A MESSAGE SERVICE AND IDENTITY SERVICE IN A 5G NETWORK

(71) Applicant: IPLA HOLDINGS INC., New York, NY (US)

(72) Inventors: Hongkun Li, Malvern, PA (US); Michael Starsinic, Newtown, PA (US); Rocco Di Girolamo, Laval (CA); Catalina Mladin, Hatboro, PA (US); Chonggang Wang, Princeton, NJ (US); Quang Ly, North Wales, PA (US); Dale Seed, Allentown, PA (US)

(73) Assignee: CONVIDA WIRELESS, LLC, Wilmington, DE (US)

( * ) Notice: Subject to any disclaimer, the term of this patent is extended or adjusted under 35 U.S.C. 154(b) by 357 days.

(21) Appl. No.: 17/421,838

(22) PCT Filed: Dec. 10, 2019

(86) PCT No.: PCT/US2019/065422
§ 371 (c)(1),
(2) Date: Jul. 9, 2021

(87) PCT Pub. No.: WO2020/146076
PCT Pub. Date: Jul. 16, 2020

(65) Prior Publication Data
US 2022/0116770 A1    Apr. 14, 2022

Related U.S. Application Data

(60) Provisional application No. 62/790,867, filed on Jan. 10, 2019.

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0861* (2013.01); *H04W 4/12* (2013.01); *H04W 8/20* (2013.01); *H04W 12/08* (2013.01)

(58) Field of Classification Search
CPC ......... H04W 12/06; H04W 4/12; H04W 8/20; H04L 63/0861; H04L 63/10; G06F 21/32
See application file for complete search history.

(56) References Cited

U.S. PATENT DOCUMENTS

| | | |
|---|---|---|
| 10,013,983 B1 | 7/2018 | Johnson et al. |
| 10,299,128 B1 * | 5/2019 | Suthar ................ H04L 9/30 |
| 2023/0262062 A1 * | 8/2023 | Starsinic ............ H04W 12/04 |
| | | 713/171 |

FOREIGN PATENT DOCUMENTS

| WO | 2018/109014 A1 | 6/2018 |
|---|---|---|
| WO | WO-2018109014 A1 * | 6/2018 |

OTHER PUBLICATIONS

China Mobile et al., "FS_5GMSG TR 22.824 use case: shared bike communication," 3GPP TSG-SA WG1 Meeting #80, SI-174454, Nov. 27, 2017-Dec. 1, 2017, pp. 2.

* cited by examiner

*Primary Examiner* — Justin Y Lee
(74) *Attorney, Agent, or Firm* — CHIP LAW GROUP

(57) ABSTRACT

A first apparatus includes a processor, a memory, and communication circuitry. The first apparatus is connected to a communications network via its communication circuitry. The first apparatus further includes computer-executable instructions stored in the memory of the first apparatus which, when executed by the processor of the first apparatus, cause the first apparatus to: receive voice content or other biometric content of a user; prepare a message including the voice or other biometric content; send the message to the communications network or a second apparatus through a (Continued)

control plane of the communications network in order to authenticate and authorize the first apparatus and the user; receive a response message from the communications network or the second apparatus, wherein the response message includes authentication and authorization results for the first apparatus and identification information that identifies the user.

10 Claims, 31 Drawing Sheets

(51) Int. Cl.
      *H04W 4/12*       (2009.01)
      *H04W 8/20*       (2009.01)
      *H04W 12/08*     (2021.01)

APPARATUS, SYSTEM, METHOD, AND COMPUTER-READABLE MEDIUM FOR PERFORMING A MESSAGE SERVICE AND IDENTITY SERVICE IN A 5G NETWORK

CROSS REFERENCE TO RELATED APPLICATIONS

This application is the National Stage Application of International Patent Application No. PCT/US2019/065422, filed Dec. 10, 2019 which claims the benefit of U.S. Provisional Application No. 62/790,867, filed Jan. 10, 2019, which is incorporated herein by reference in its entirety.

FIELD

The present disclosure relates to a system and method for performing a message service and an identity service in a communications network.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Today, more and more smart devices allow people to send a message/request message that is input in various forms/types, such as voice, a finger print, an image, etc. However, this trend creates a problem for a 5G network on how to deal with these new forms/types of inputs, such as how to authenticate/authorize a user who may share a 5G device with other users, and how to deliver such a message/request message through a 5G network.

SUMMARY

An exemplary embodiment of the present disclosure provides a first apparatus that includes a processor, a memory, and communication circuitry. The first apparatus is connected to a communications network via its communication circuitry. The first apparatus further includes computer-executable instructions stored in the memory of the first apparatus which, when executed by the processor of the first apparatus, cause the first apparatus to: receive voice content or other biometric content of a user; prepare a message including the voice or other biometric content; send the message to the communications network or a second apparatus through a control plane of the communications network in order to authenticate and authorize the first apparatus and the user; receive a response message from the communications network or the second apparatus, wherein the response message includes authentication and authorization results for the first apparatus and identification information that identifies the user.

An exemplary embodiment of the present disclosure provides a first apparatus that includes a processor, a memory, and communication circuitry. The first apparatus is connected to a communications network via its communication circuitry. The first apparatus further includes computer-executable instructions stored in the memory of the first apparatus which, when executed by the processor of the first apparatus, cause the first apparatus to: generate a message to be sent to a group of second apparatuses; send a group message delivery request to a 5G message service on the communications network, wherein the group message delivery request includes a preferred transport method for sending the group message to the group of second apparatuses and the group message delivery request indicates what level of acknowledgment is required; and receive, if acknowledgement is required, an acknowledgment (ACK) signal from the 5G message service.

An exemplary embodiment of the present disclosure provides a first apparatus that includes a processor, a memory, and communication circuitry. The first apparatus is connected to a communications network via its communication circuitry. The first apparatus further includes computer-executable instructions stored in the memory of the first apparatus which, when executed by the processor of the first apparatus, cause the first apparatus to: send a subscription request message to a 5G message service, wherein the subscription request message is a request to subscribe to a particular event or message; receive a response acknowledging that the subscription has been successful from a network entity; and receive a notification from the 5G message service that the particular event or message that is subscribed to has occurred.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein:

FIG. 18 shows a procedure of managing subscription in 5G MSG from SCS/AS;

FIG. 20 shows a procedure of sending 5G MSG notification to SCS/AS;

FIG. 22 shows a procedure of publishing message in 5G MSG from SCS/AS; and

Figure 1A:
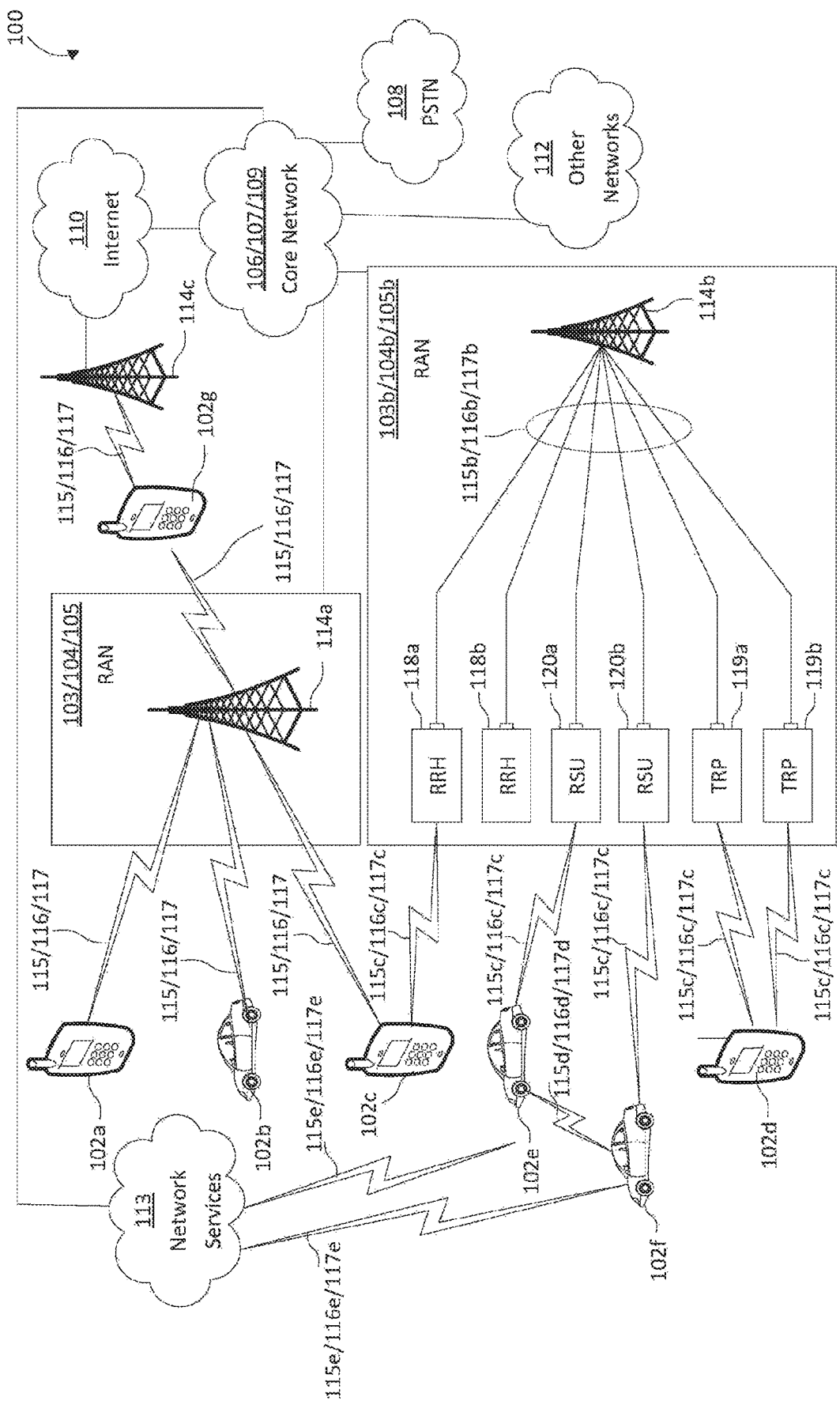
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The following is a list of acronyms relating to service level and core network technologies that may appearing the below description. Unless otherwise specified, the acronyms used herein refer to the corresponding term listed below.

TABLE 1

Abbreviations

3GPP - 3rd Generation Partnership Project
5GC - 5G Core Network
5G MSG - 5G Message Service
5G_MSGF - 5G MSG management function
5G_MSG_GW - 5G MSG Gateway function
AAA - Authentication, Authorization, and Accounting
AF - Application Function
AMF - Access and Mobility Management Function TABLE 1-continued Abbreviations AS - Application Server
AUSF - Authentication Server Function
BM-SC - Broadcast and Multicast Service Center
CM - Connection Management
CN - Core Network
CP - Control Plane
DL - Downlink
DN - Data Network
DNN - Data Network Name
EPC - Evolved Packet Core
EPS - Evolved Packet System
FQDN - Fully Qualified Domain Name
LTE - Long Term Evolution
NAS - Non Access Stratum
NRF - NF Repository Function
NEF - Network Exposure Function
NE - Network Function
NIDD - Non-IP Data Delivery
NSSF - Network Slice Selection Function
NWDAF - Network Data Analytics Function
PCF - Policy Control Function
PDU - Protocol Data Unit
ProSe - Proximity Service
QoS - Quality of Service
RAN - Radio Access Network
RM - Registration Management
SCS - Services Capability Server
SCEF - Service Capability Exposure Function
SMF - Session Management Function
SMSF - Short Message Service Function
SMS-SC - SMS Service Center
UDM/UDR - Unified Data Management/Unified Data Repository
UDR - User Data Repository
UE - User Equipment
UL - Uplink
UPF - User Plane Function An NF is a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure.

An NF Service is one type of capability exposed by an NF (NF Service Producer) to other authorized NF (NF Service Consumer) through a service-based interface. Network Function may expose one or more NF services. For example, AMF provides a Namf_EventExposure service, which enables AMF to send notification to NFs that subscribe certain mobility management related events.

Today, more and more smart devices allow people to put a request in the form of voice, such as by a voice assistance device. This disclosure focuses on the use cases where the input from a UE to a 5G network is voice. As discussed below, this application addresses two main problems: 1) secondary authentication and authorization for a specific user based on various types of inputs (e.g., voice, image, finger print, etc.), who may not have a 3GPP subscription; and 2) a method of identifying the target recipient UE which is not identified by processing the voice command. This disclosure describes a 5G message service to transfer messages between a UE and an AF, or between two UEs. The message payload may include a voice command, an image, a finger print, or a video. An overall architecture of a 5G message service is proposed to enable the message transfer in different forms (e.g., voice, image, video, etc.). Moreover, the control plane protocol stack and user plane stack are described respectively for a 5G message service. A general procedure is disclosed to highlight several main procedures in a 5G network to process a voice input. A method of secondary authentication and authorization procedure is described to authenticate and authorize a specific user who may not have a 3GPP subscription during the registration process.

A method of secondary authentication and authorization procedure is described to authenticate and authorize a specific user who may not have a 3GPP subscription during the PDU session establishment process. An exemplary embodiment of the present disclosure includes a method of delivering a message from a UE to another UE, including a procedure of identifying and confirming the recipient UE when the voice command involves a UE, whose identifier is not known to the network. A subscription/notification model of a 5G message service is also disclosed, where a 5G message broker is included in the 5G network. Note that the described architecture of methods can be also applied to other forms of messages, such as a finger print, a voice, an image, and video. Moreover, a method on how a UE discovers and registers to the 5G message service in 5GC is presented. Methods of group message delivery in 5G message service are presented, including the scenario that the message is originated from a UE and delivered to a group of UEs, and originated from a SCS/AS and delivered to a group of UEs. Mechanisms of subscribing to 5G message service, sending notification from 5G message service and publishing to 5G message service are also included.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, Network Services 113, and/or the other networks 112. Examples of Network Services may include V2X Services, ProSe Services, IoT Services, Video Streaming, Edge Computing, etc. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRU 102c, to facilitate access to one or more communication networks, such as the core network 106/107/109, the Internet 110, Network Services 113, and/or other networks 112. TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a base transceiver station (BTS), a Node-B, an eNode B, a Home Node B, a Home eNode B, a next generation node-B (gNode B), a satellite, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c,102d, 102e, 102f, and/or 102g may communicate with one another over a direct air interface 115d/116d/117d, such as Vehicle-to-Vehicle (V2V) sidelink communication, and WTRUs 102a, 102b, 102c, 102d, 102e, 102f, and/or 102g may communicate with Network Service 113 over a direct air interface 115e/116e/117e, such as Vehicle-to-Infrastructure (V2I) sidelink communication, (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b, TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). The air interface 115/116/117 or 115c/116c/117c may implement 3GPP NR technology. The LTE and LTE-A technology includes LTE D2D and V2X technologies and interface (such as Sidelink communications, etc.). The 3GPP NR technology includes NR V2X technologies and interface (such as Sidelink communications, etc.).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be needed to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or voice over internet protocol (VoIP) services to one or more of the WTRUs 102a, 102b, 102c, 102d, and 102f. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e, and 102f to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the networks 112 may include any type of packet data network (i.e., an IEEE 802.3 ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
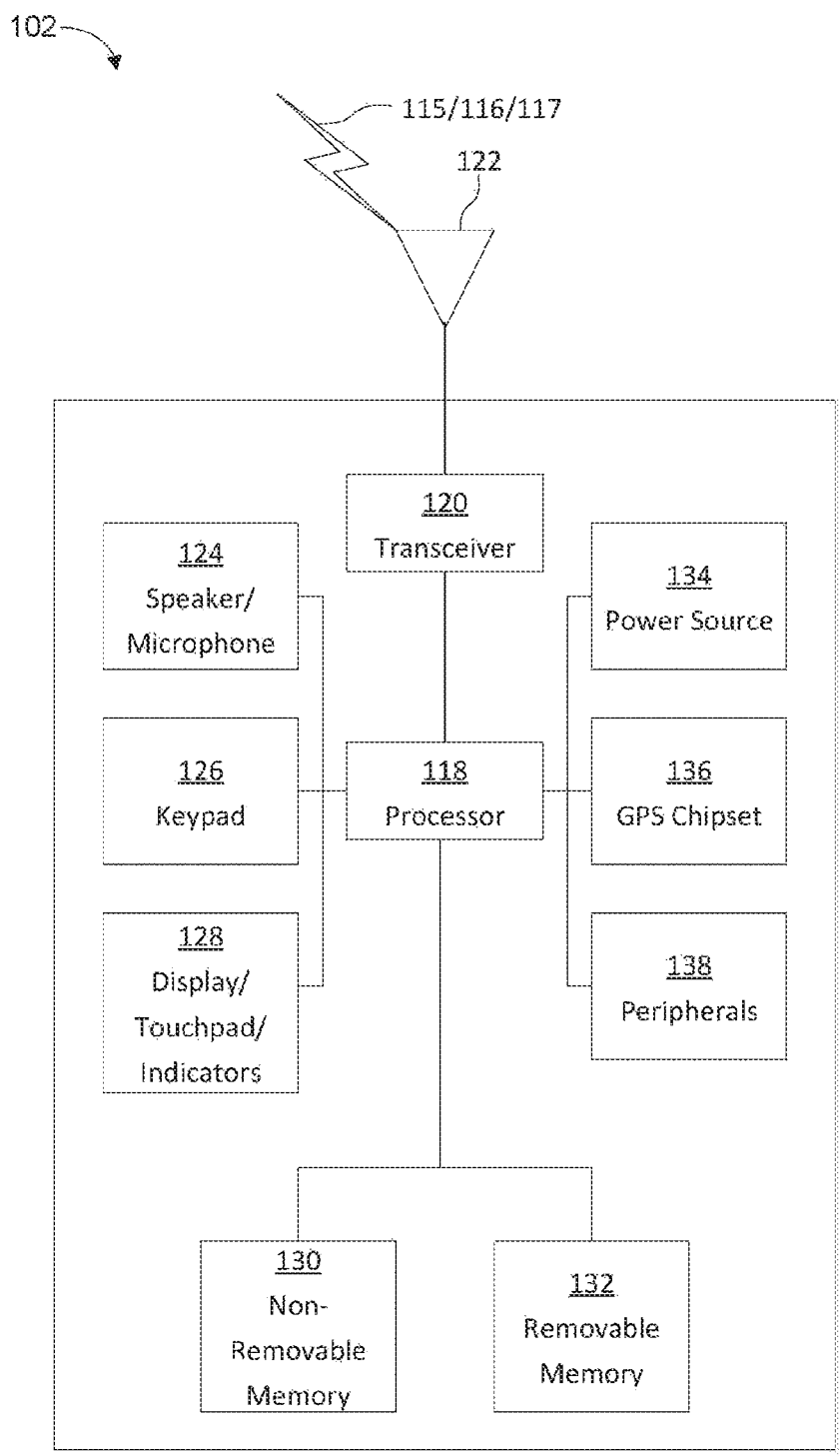
FIG. 1B is a system diagram of an example apparatus or device configured for wireless communications.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a) over the air interface 115/116/117 or another UE over the air interface 115d/116d/117d. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/ indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1C:
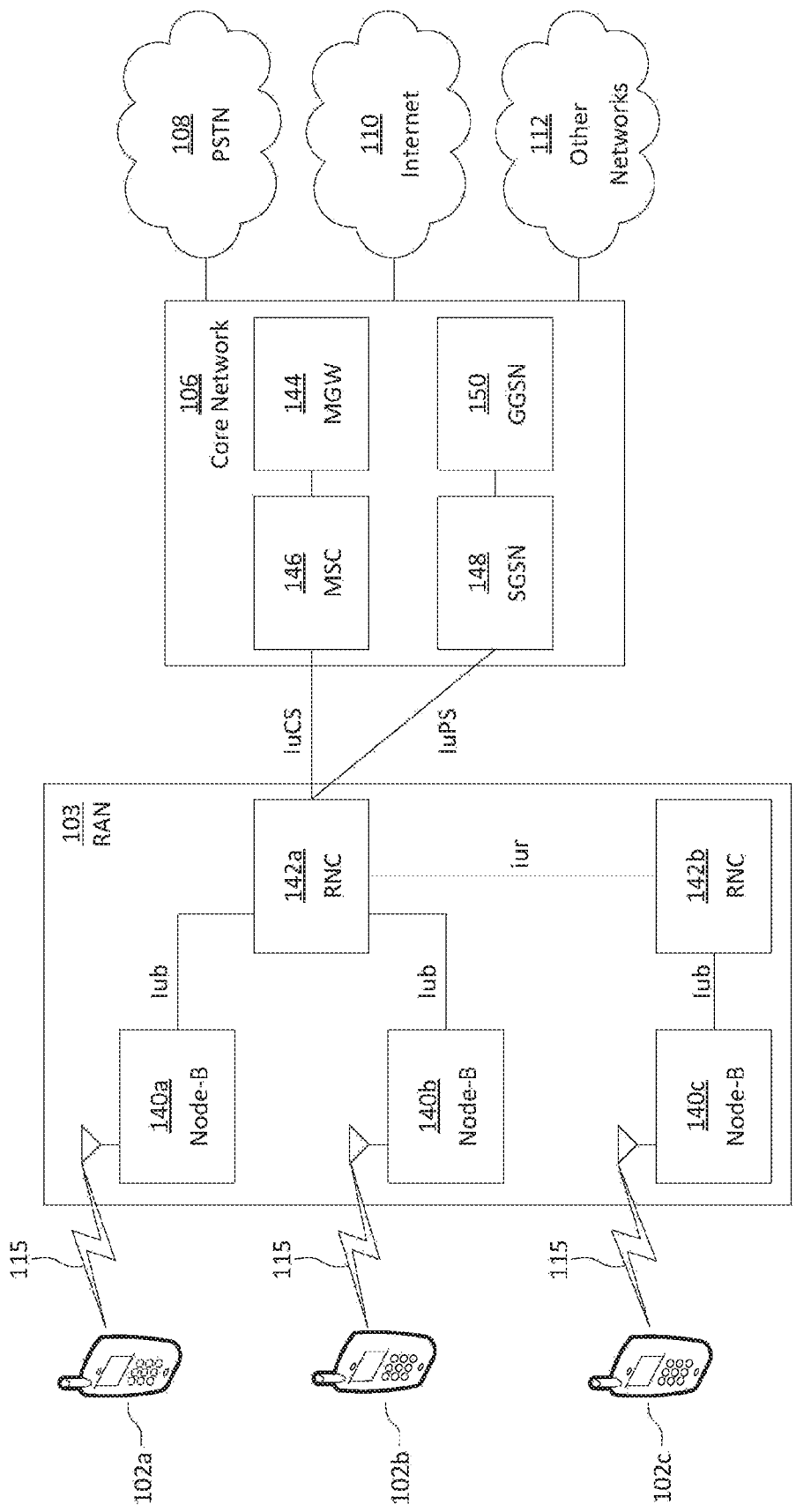
FIG. 1C is a system diagram that shows an example of a Radio Access Network (RAN) architecture and a core network architecture.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired or wireless networks that are owned and/or operated by other service providers.

Figure 1D:
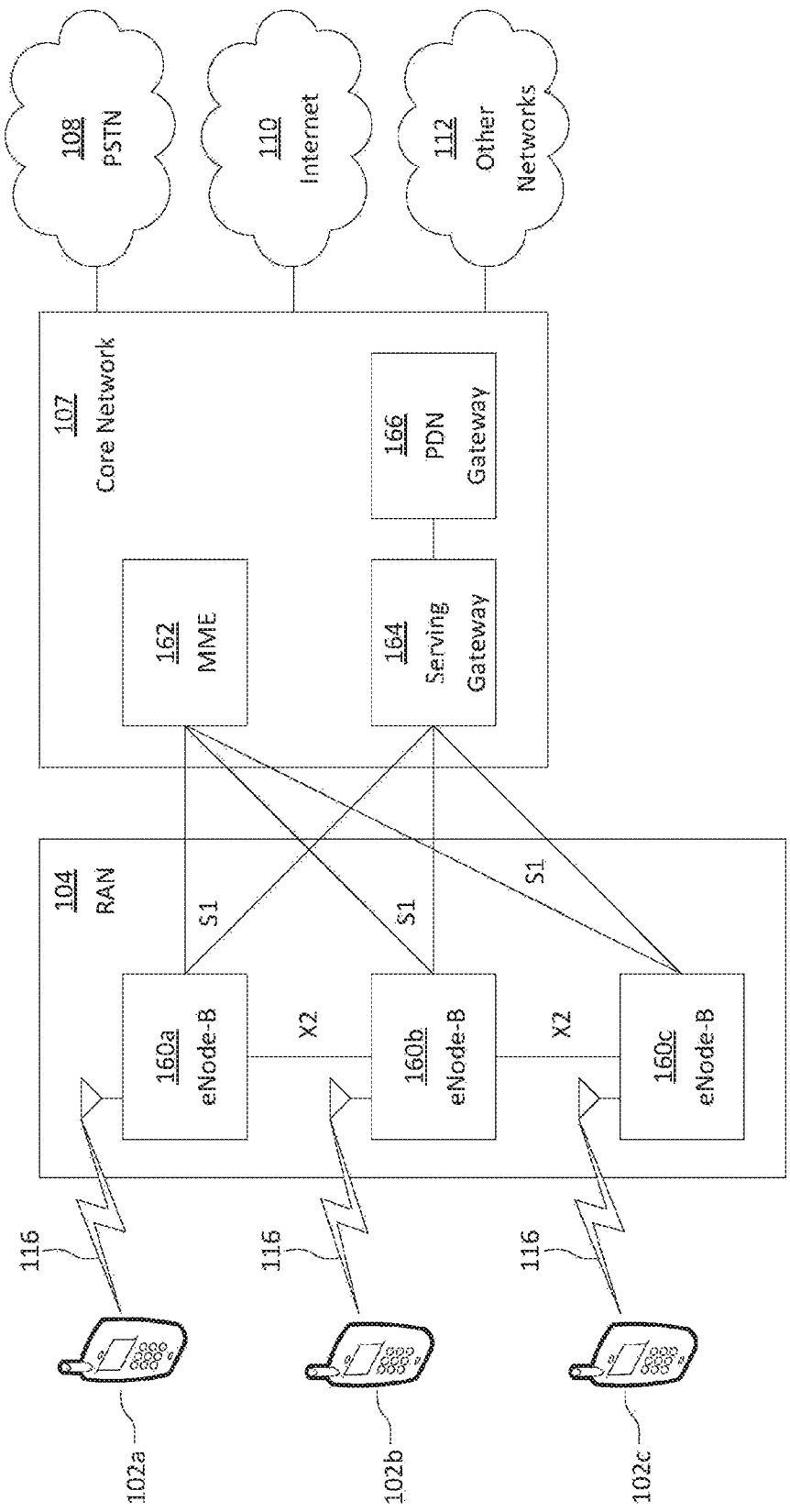
FIG. 1D is a system diagram that shows an example of a Radio Access Network (RAN) architecture and a core network architecture.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
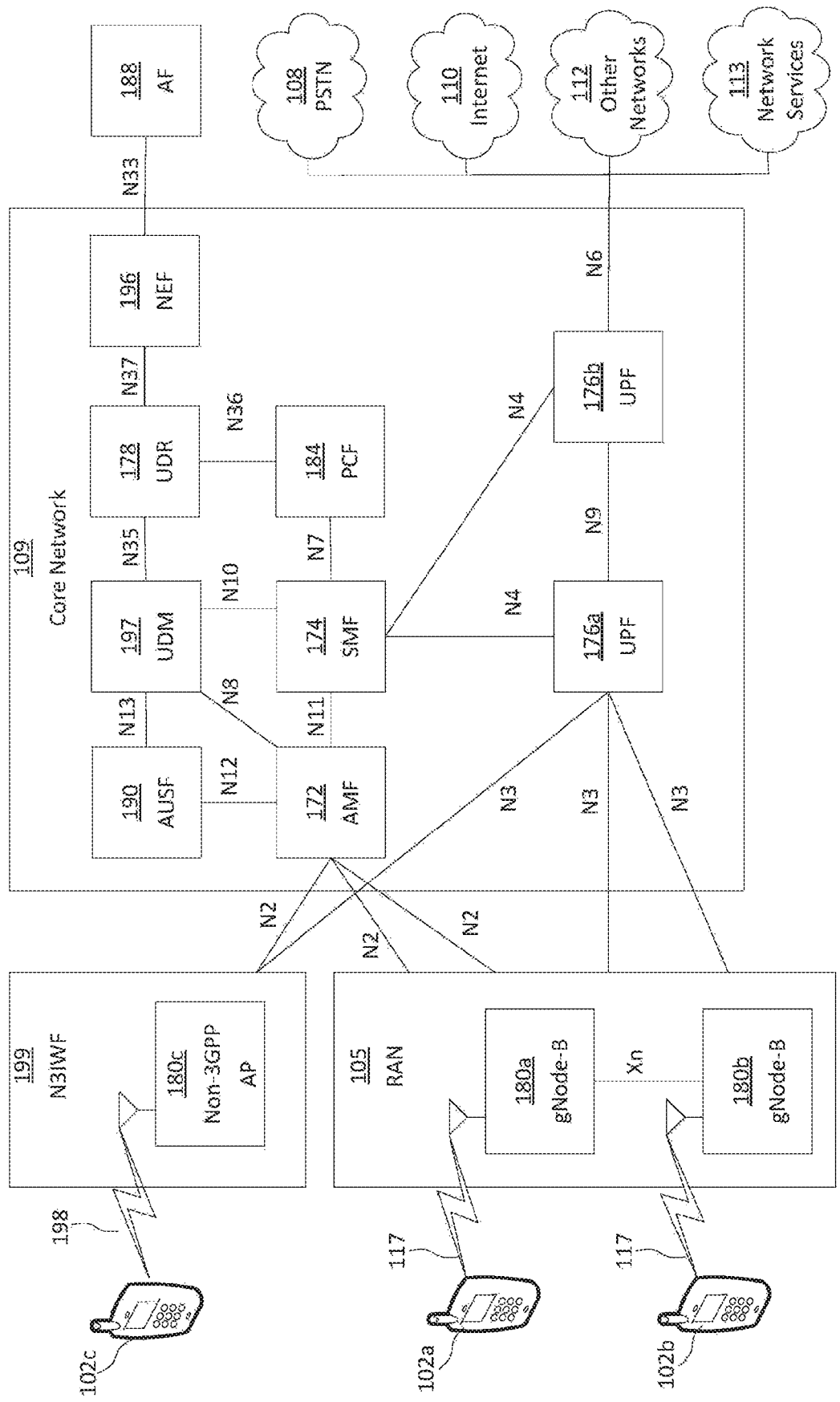
FIG. 1E is a system diagram that shows an example of a Radio Access Network (RAN) architecture and a core network architecture.

FIG. 1E is a system diagram of the RAN 105 and the core network 109 according to an embodiment. The RAN 105 may employ an NR radio technology to communicate with the WTRUs 102a and 102b over the air interface 117. The RAN 105 may also be in communication with the core network 109. The N3IWF 199 may employ a non-3GPP radio technology to communicate with the WTRU 102c over the air interface 198. The N3IWF 199 may also be in communication with the core network 109.

The RAN 105 may include gNode-Bs 180a and 180b though it will be appreciated that the RAN 105 may include any number of gNode-Bs while remaining consistent with an embodiment. The gNode-Bs 180a and 180b may each include one or more transceivers for communicating with the WTRUs 102a and 102b over the air interface 117. In an embodiment that uses an integrated access and backhaul connection, the same air interface may be used between the WTRUs and gNode-Bs which may be the core network 109 via one or multiple gNBs. In an embodiment, the gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It should also be appreciated that the RAN 105 may employ more than one type of base station. For example, the RAN may employ eNode-Bs and gNode-Bs.

The N3IWF 199 may include a non-3GPP Access Point 180c though it will be appreciated that the N3IWF 199 may include any number of non-3GPP Access Points while remaining consistent with an embodiment. The non-3GPP Access Point 180c may include one or more transceivers for communicating with the WTRUs 102c over the air interface 198. In an embodiment, the non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1E, the gNode-Bs 180a and 180b may communicate with one another over an Xn interface.

The core network 109 shown in FIG. 1E may be a 5G core network (5GC) The 5GC may offer numerous communication services to customers who are interconnected by the radio access network. The 5G Core Network 109 comprises a number of entities that perform the functionality of the core network. As used herein, the term "core network entity" or "network function" refers to any entity that performs one or more functionalities of a core network. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 1F.

As shown in FIG. 1E, the 5G Core Network 109 may include an access and mobility management function (AMF) 172, a session management function (SMF) 174, user plane functions (UPF) 176a and 176b, a user data management function (UDM) 197, an authentication server function (AUSF) 190, a Network Exposure Function (NEF) 196, a policy control function (PCF) 184, a non-3GPP interworking function (N3IWF) 199 an application function (AF) 188, a User Data Repository (UDR) 178. While each of the foregoing elements are depicted as part of the 5G core network 109, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 1E shows that network functions directly connect to one another, however, it should be appreciated that they may communicate via routing agents such as a diameter routing agent or message buses. Although FIG. 1E shows that connectivity between network functions is achieved via a set of interfaces, or reference points, it should be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, 102c via an N1 interface. The N1 interface is not shown in FIG. 1E.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, IP address allocation for the WTRUs 102a, 102b, 102c, management and configuration of traffic steering rules in the UPF 176a and UPF 176b, and generation of downlink data notifications to the AMF 172.

The UPF 176a and UPF 176b may provide the WTRUs 102a, 102b, 102c with access to a packet data network (DN), such as the Internet 110, to facilitate communications between the WTRUs 102a, 102b, 102c and other devices. The UPF 176a and UPF 176b may also provide the WTRUs 102a, 102b, 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199 via an N2 interface. The N3IWF facilities a connection between the WTRU 102c and the 5G core network 170 via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and connected to an application function (AF) 188 via an N5 interface. The N15 and N5 interfaces are not shown in FIG. 1E. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, 102c so that the AMF may deliver the policies to the WTRUs 102a, 102b, 102c via an N1 interface. Policies may then be enforced, or applied, at the WTRUs 102a, 102b, 102c.

The UDR 178 acts as a repository for authentication credentials and subscription information. The UDR may connect to Network Functions so that Network Function can add to, read from, and modify the data that is in the repository. For example, the UDR 178 may connect to the PCF 184 via an N36 interface, the UDR 178 may connect to the NEF 196 via an N37 interface, and the UDR 178 may connect to the UDM 197 via an N35 interface.

The UDM 197 may serve as an interface between the UDR 178 and other Network Functions. The UDM 197 may authorize Network Functions access of the UDR 178. For example, the UDM 197 may connect to the AMF 172 via an N8 interface, the UDM 197 may connect to the SMF 174 via an N10 interface, and the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions 188. Exposure occurs on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network based on the concept of Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of Network Slicing techniques, it is likely that the network architecture would not be flexible and scalable enough to efficiently support a wider range of use cases need when each use case has its own specific set of performance, scalability and availability requirements. Furthermore, introduction of new network services should be made more efficient.

In a network slicing scenario, a WTRU 102a, 102b, 102c may connect to an AMF 172, via an N1 interface. The AMF may be logically part of one or more slices. The AMF may coordinate the WTRU's connection or communication with one or more UPF(s) 176, SMF(s) 174, and other Network Functions. Each of the UPF(s) 176, SMF(s) 174, and other Network Functions may be part of different or the same slices. When they are part of different slices, they may be isolated from each other in the sense that they may utilize different computing resources, security credentials, etc.

The 5G core network 109 may facilitate communications with other networks. For example, the 5G core network 109 may include, or may communicate with, an IP gateway (e.g., an IP multimedia subsystem (IMS) server) that serves as an interface between the 5G core network 109 and the PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, 102c and servers or applications functions 188. In addition, the core network 170 may provide the WTRUs 102a, 102b, 102c with access to the networks 112, which may include other wired or wireless networks that are owned and/or operated by other service providers.

The core network entities described herein and illustrated in FIGS. 1A, 1C, 1D, and IE are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and IE are provided by way of example only, and it is understood that the subject matter disclosed and claimed herein may be embodied or implemented in any similar communication system, whether presently defined or defined in the future.

Figure 1F:
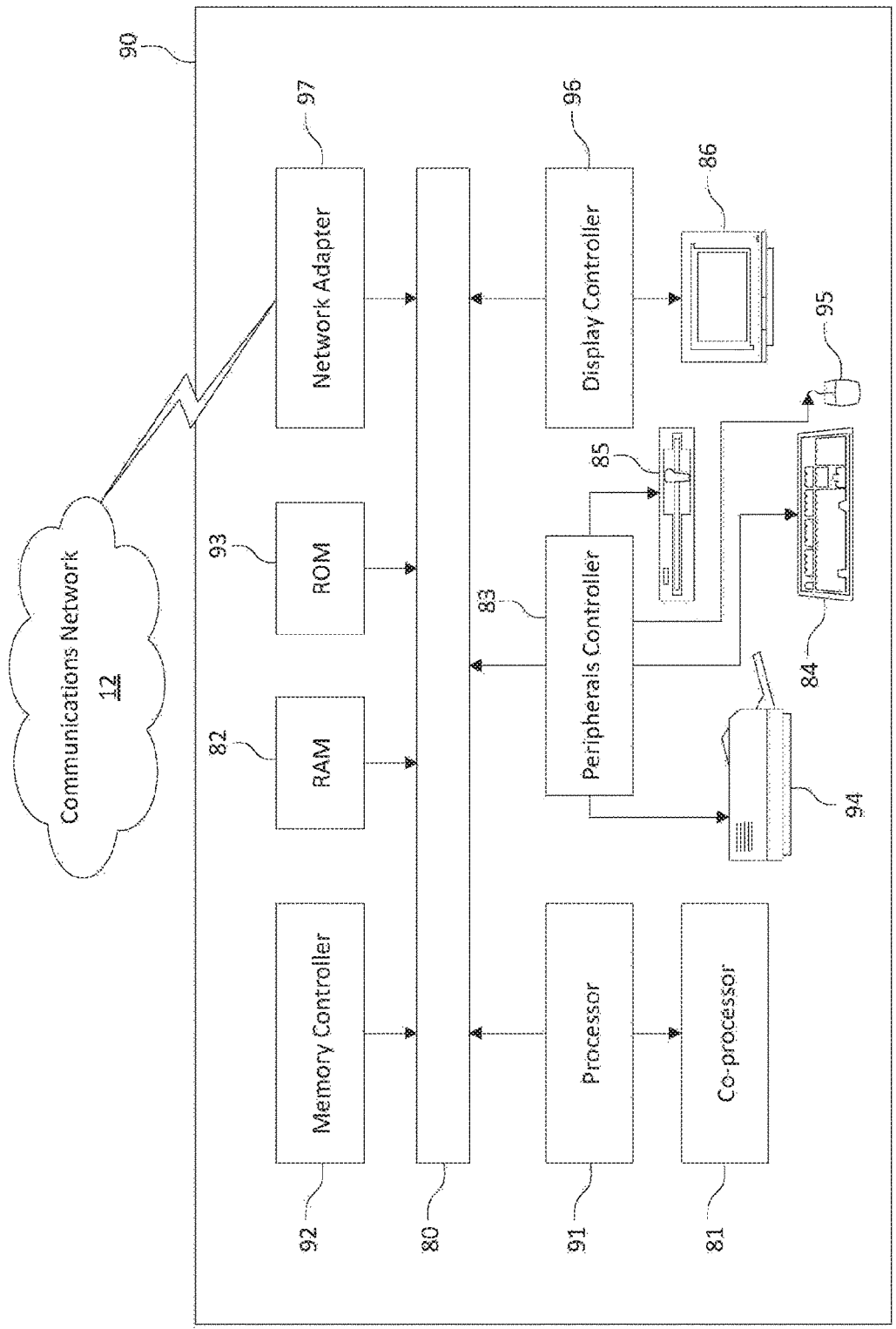
FIG. 1F is a system diagram that shows an example of a computing system used in a communication network.

FIG. 1F is a block diagram of an exemplary computing system 90 in which one or more apparatuses of the communications networks illustrated in FIGS. A, 1C, 1D and IE may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as, for example, a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and IE, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
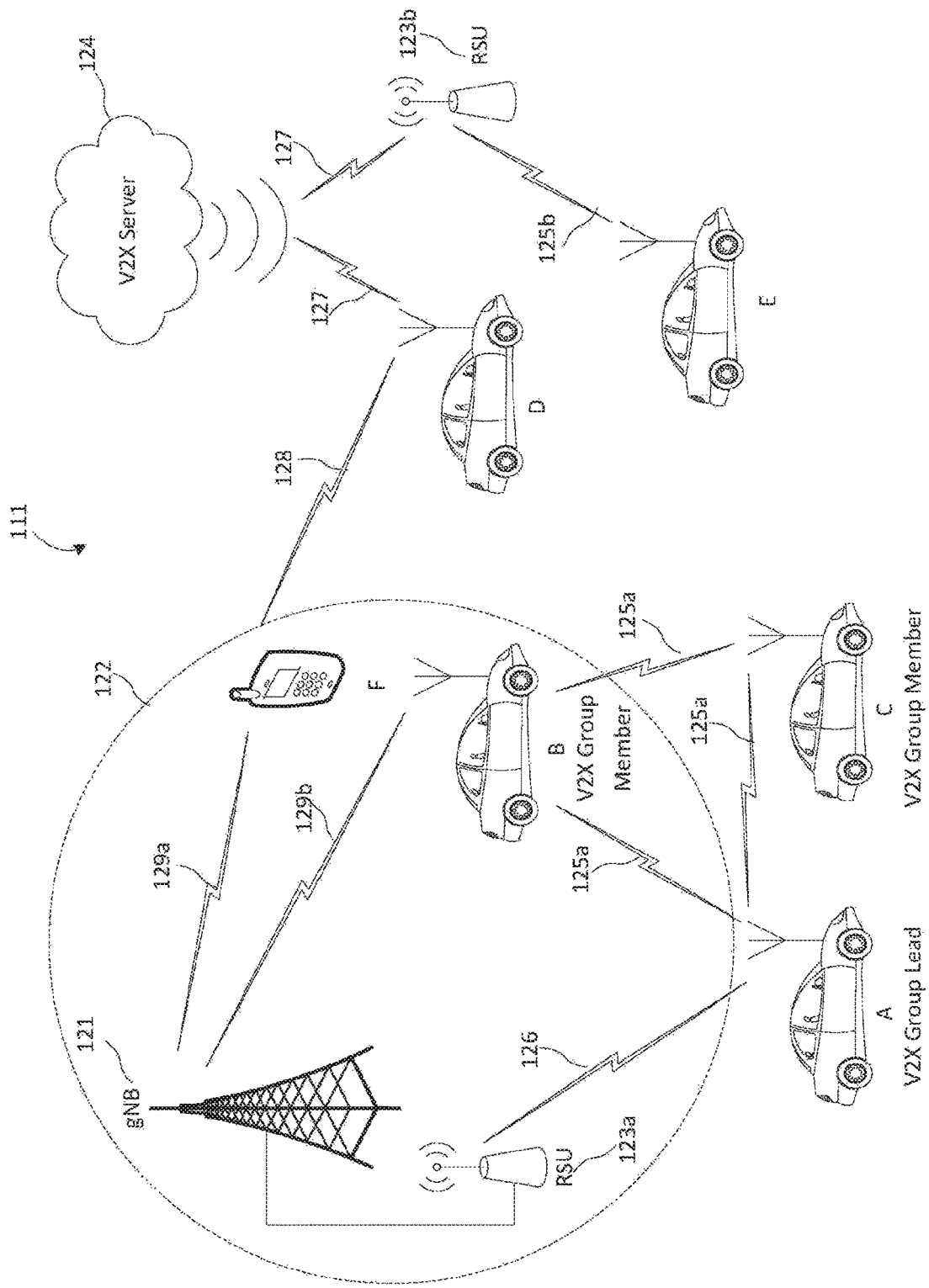
FIG. 1G is a system diagram that shows an example 3GPP architecture.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station gNB 121, a V2X server 124, and RSU 123a and RSU 123b, though it will be appreciated that the disclosed embodiments contemplate any number of WTRUs, base station gNBs, V2X networks, and/or network elements. One or several or all WTRUs A, B, C, D, E may be out of range of the access network coverage 122. WTRUs A, B, C form a V2X group, among which WTRU A is the group lead and WTRU B and WTRU C are group members. WTRUs A, B, C, D, E, F may communicate among them over Uu interface 129a/129b if under the access network coverage or sidelink (PC5 or NR PC5) interface 125a if under or out of the access network coverage. WTRUs A, B, C, D, E, F may communicate to an RSU via a Vehicle-to-Network (V2N) interface 126 or sidelink interface 125b. WTRUs A, B, C, D, E, F may communicate to a V2X Server 124 via a Vehicle-to-Infrastructure (V2I) interface 127. WTRUs A, B, C, D, E, F may communicate to another UE via a Vehicle-to-Person (V2P) interface 128.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

Figure 2:
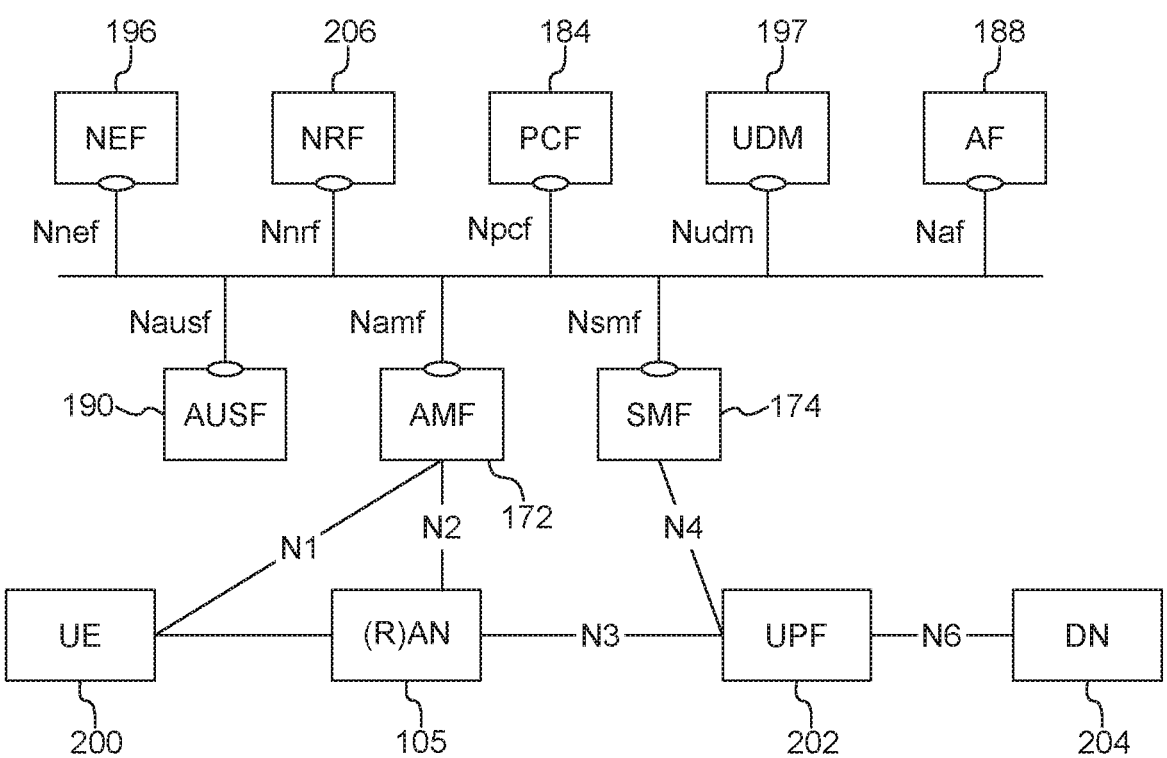
FIG. 2 shows a 5G non-roaming reference architecture with service-based interfaces within the Control Plane in accordance with an exemplary embodiment.

FIG. 2 shows a non-roaming reference architecture of 5G core network with service-based interfaces within the Control Plane. The architecture of FIG. 2 includes, among others, a UE 200, an AMF 172, an SMF 174, a NEF 196, a PCF 184, an AF 188, an AUSF 190, a UDM 197, a UPF 202, a DN 204, and a NRF 206. N1 is the reference point that is used for communication between the UE 200 and the AMF 172. N2 is the reference point that is used for communication between the (R)AN 105 and the AMF 172. N3 is the reference point that is used for communication between the (R)AN 105 and the UPF 202. N4 is the reference point that is used for communication between the SMF 174 and the UPF 202. N6 is the reference point that is used for communication between a data network (DN) 204 and the UPF 202. Moreover, Namf is the service-based interface exhibited by AMF 172. Other NFs can access any services provided by AMF through Namf. Nsmf is the service-based interface exhibited by SMF 174. Other NFs can access any services provided by SMF through Nsmf. Nnef is the service-based interface exhibited by NEF 196. Npcf is the service-based interface exhibited by PCF 184. Naf is the service-based interface exhibited by AF 188. Nausf is the service-based interface exhibited by AUSF 190. Nudm is the service-based interface exhibited by UDM 197. Nnrf is the service-based interface exhibited by NRF 206.

Architecture of 5G Network

Figure 3:
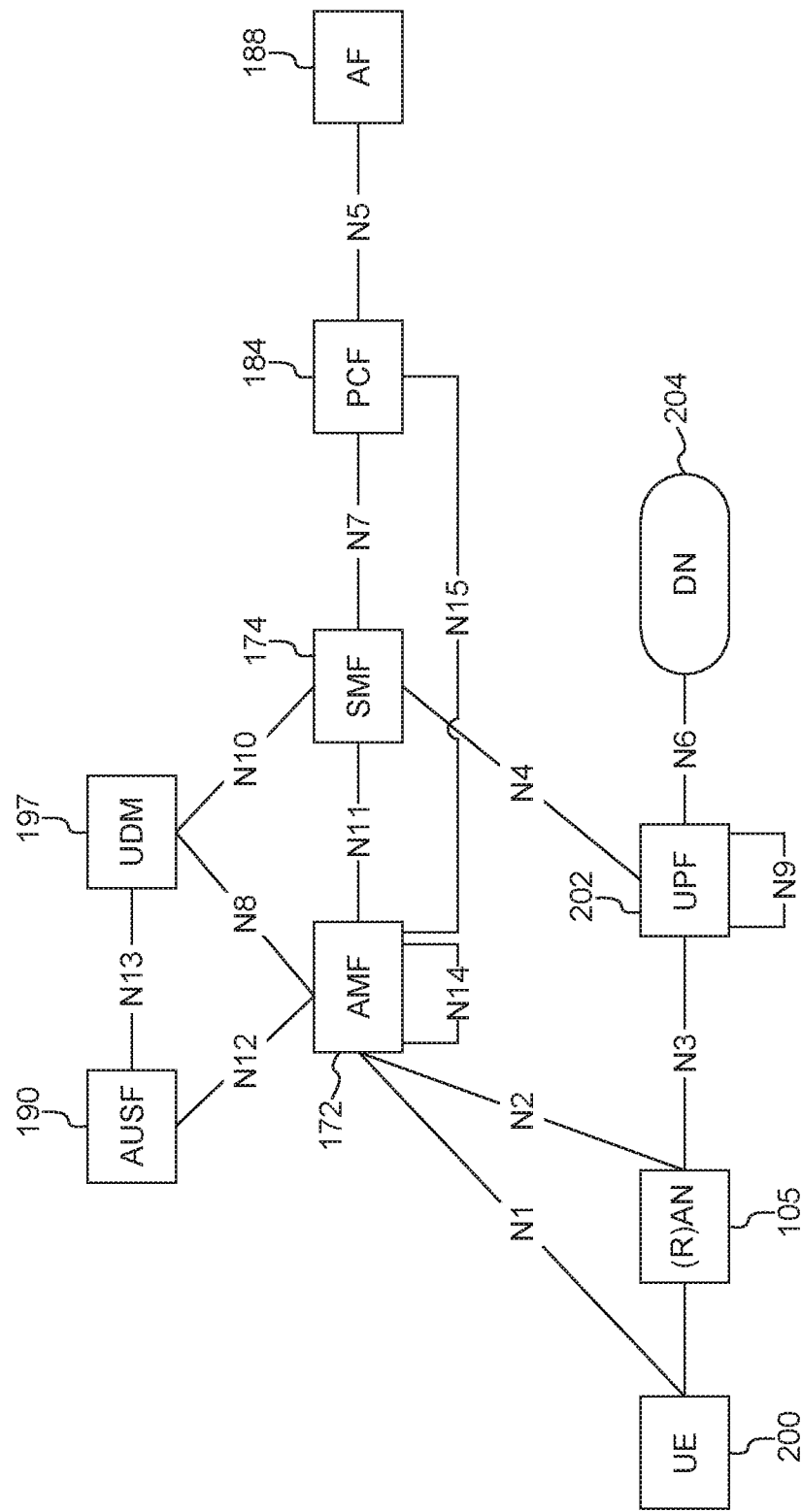
FIG. 3. shows a 5G System architecture in a non-roaming case, in accordance with an exemplary embodiment.

FIG. 3 depicts the 5G System architecture in the non-roaming case, using the reference point representation showing how various network functions interact with each other. FIG. 3 includes, among others, a UE 200, an AMF 172, an SMF 174, a NEF 196, a PCF 184, an AF 188, an AUSF 190, a UDM 197, a UPF 202, and a DN 204. N1 is the reference point that is used for communication between the UE 200 and the AMF 172. N2 is the reference point that is used for communication between the (R)AN 105 and the AMF 172. N3 is the reference point that is used for communication between the (R)AN 105 and the UPF 202. N4 is the reference point that is used for communication between the SMF 174 and the UPF 202. N5 is the reference point that is used for communication between the PCF 184 and the AF 188. N6 is the reference point that is used for communication between a data network (DN) 204 and the UPF 202. N7 is the reference point that is used for communication between the SMF 174 and the PCF 184. N8 is the reference point that is used for communication between the UDM 197 and the AMF 172. N9 is the reference point that is used for communication between 2 UPFs 202. N10 is the reference point that is used for communication between the UDM 197 and the SMF 174. N11 is the reference point that is used for communication between the AMF 172 and the SMF 174. N12 is the reference point that is used for communication between AMF 172 and AUSF 190. N13 is the reference point that is used for communication between the UDM 197 and the AUSF 190. N14 is the reference point that is used for communication between 2 AMFs 172. It is worth noting that the mobility management and session management functions are separated. A single N1 NAS connection is used for both Registration Management and Connection Management (RM/CM) and for SM-related messages and procedures for a UE 200. The single N1 termination point is located in AMF 172. The AMF 172 forwards SM related NAS information to the SMF 174. AMF 172 handles the Registration Management and Connection Management part of NAS signaling exchanged with the UE 200. SMF 174 handles the Session management part of NAS signaling exchanged with the UE 200.

Secondary Authentication/Authorization in PDU Session Establishment

Figure 4:
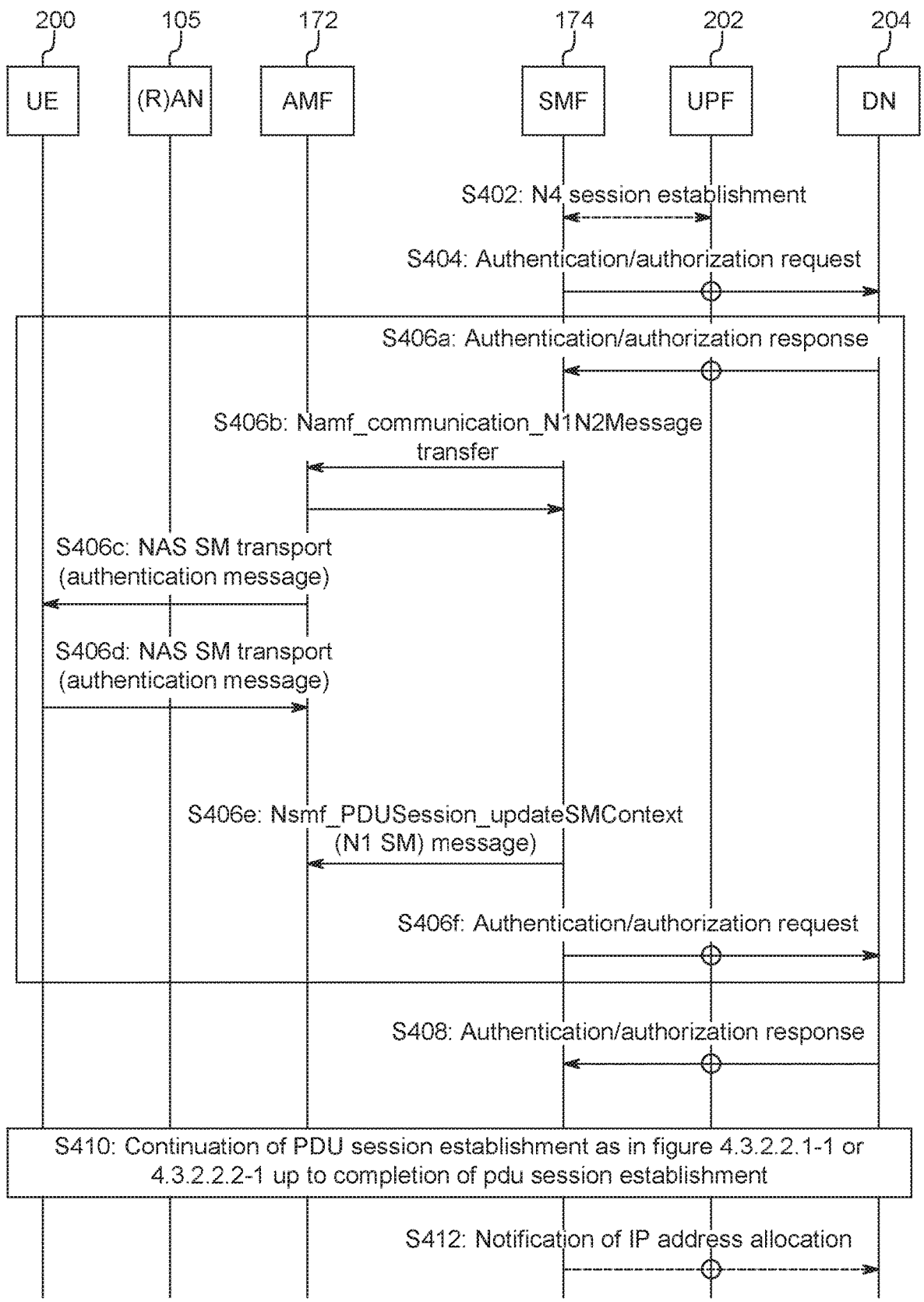
FIG. 4 shows a procedure of PDU Session establishment authentication and an authorization procedure in accordance with an exemplary embodiment.

Release 15 defines an optional PDU session establishment authentication/authorization procedure in cases that the DN 204 performs an additional authentication before establishing a PDU session between the DN 204 and the UE 200. The procedure is triggered by the SMF 174 during a PDU Session establishment and performed transparently via a UPF 202 or directly with the DN-AAA server without involving the UPF 202 if the DN-AAA server is located in the 5GC and reachable directly. FIG. 4 shows the procedure of PDU Session establishment authentication and authorization procedure.

In FIG. 4, first the SMF 174 determines that it needs to contact the DN-AAA server. The SMF 174 identifies the DN-AAA server based on local configuration, possibly using the SM PDU DN Request Container provided by the UE 200 in its NAS request.

Step S402: If there is no existing N4 session that can be used to carry DN-related messages between the SMF 174 and the DN 204, the SMF 174 selects a UPF 202 and triggers N4 session establishment.

Step S404: The SMF 174 provides a SM PDU DN Request Container received from the UE 200 to the DN-AAA via the UPF 202. When available, the SMF 174 provides the GPSI in the signaling exchanged with the DN-AAA. The UPF 202 transparently relays the message received from the SMF 174 to the DN-AAA server.

Step S406a: The DN-AAA server sends an Authentication/Authorization message towards the SMF 174. The message is carried via the UPF 202.

Step S406b: Transfer of DN Request Container information received from DN-AAA towards the UE 200.

Step S406c: The AMF 172 sends the N1 NAS message to the UE 200.

Steps S406d-S406e: Transfer of DN Request Container information received from UE 200 towards the DN-AAA.

Step S406f: The SMF 174 (In HR case it is the H-SMF) sends the content of the DN Request Container information (authentication message) to the DN-AAA server via the UPF 202.

Steps S406a-f may be repeated until the DN-AAA server confirms the successful authentication/authorization of the PDU Session.

Step S408: The DN-AAA server confirms the successful authentication/authorization of the PDU Session.

Step S410: The PDU Session establishment continues and completes.

Step S412: If requested so in Step S408 or if configured so by local policies, the SMF 174 notifies the DN-AAA with the IP/MAC address(es) and/or with N6 traffic routing information allocated to the PDU Session together with the GPSI.

Network Slicing

Figure 5:
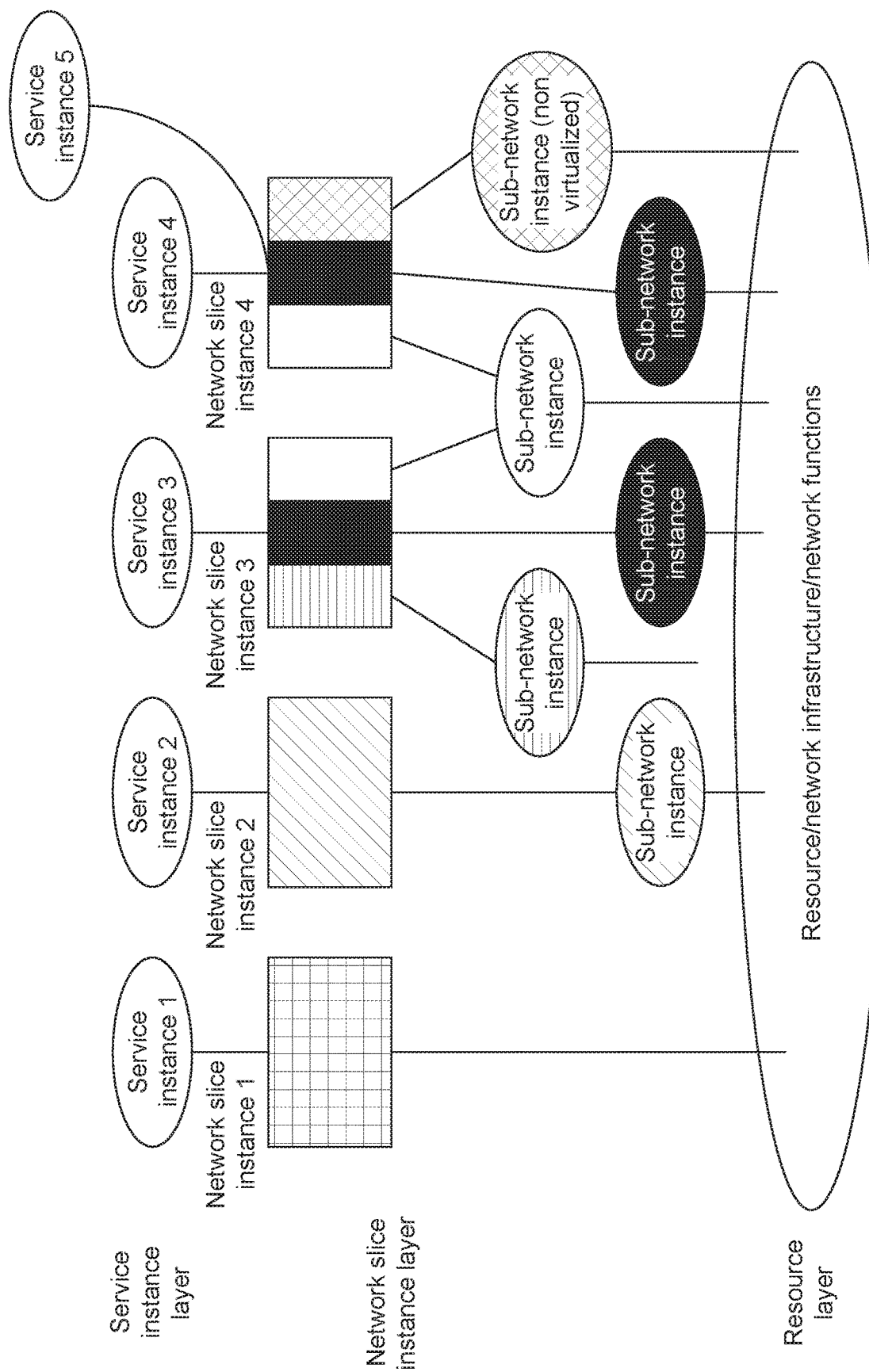
FIG. 5 shows an architecture of network slicing in accordance with an exemplary embodiment.

Network Slicing is a mechanism that could be used by mobile network operators to support multiple 'virtual' networks behind the air interface across the fixed part of the mobile operator's network, both backhaul and core network. This involves 'slicing' the network into multiple virtual networks to support different RANs or different service types running across a single RAN. Network slicing enables the operator to create networks customized to provide optimized solutions for different market scenarios which demands diverse requirements, e.g. in the areas of functionality, performance and isolation. FIG. 5 shows a conceptual architecture of network slicing.

Note:

A network slice instance is made up of a set of network functions and the resources to run these network functions, Different shadings are used to indicate the different network slice instances or sub-network slice instances.

A sub-network slice instance comprises a set of network functions and resources to run those network functions, but is not in itself a complete logical network. A sub-network slice instance may be shared by multiple network slice instances 3GPP is designing a 5G network and is considering incorporating the network slicing technology. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Figure 6:
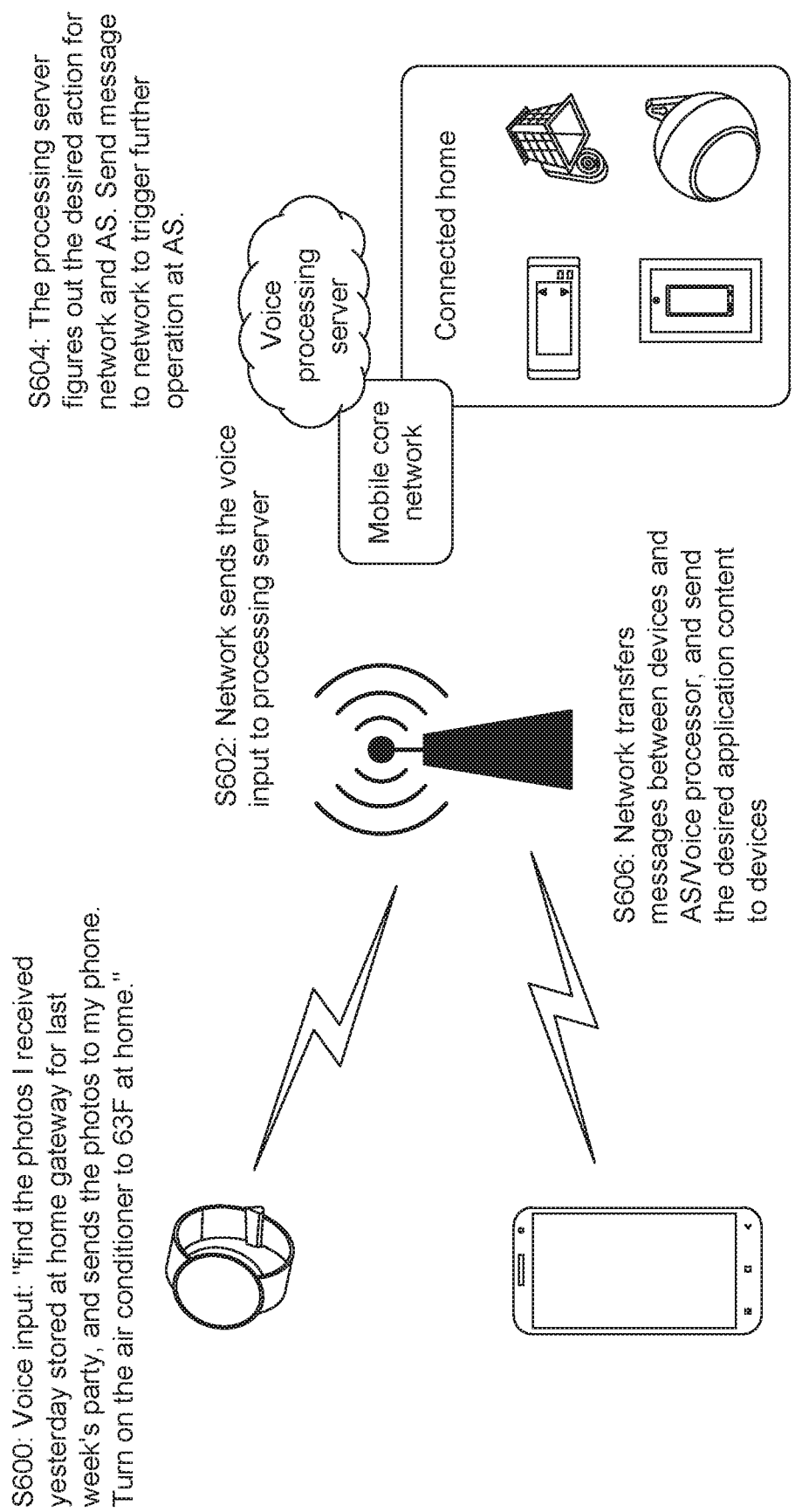
FIG. 6 shows a use case of sending a voice command via a smart watch in accordance with an exemplary embodiment.

FIG. 6 illustrates a use case in which a person tries to do two things through the voice command to his smart watch: 1) Find the photos I received yesterday stored at the home gateway for last week's party, and send the photos to my phone; and 2) turn on and set the air conditioner to 63° F. at home. This is shown in FIG. 6 as steps S600, S602, S604, and S606.

The voice command will be transferred to a processing server in or out of the network to figure out what actions are needed from both application level and network level (e.g., identify and register the user in network, create PDU session for data transfer), and then to decide the next steps.

Shared Bike Use Case: The shared bike service allows a rider to rent a bike via a mobile application and to drop it off anywhere for the next rider. This service offers users an affordable and convenient way for short city trips. In shared bike services, there are message communications between the riders and the bikes via the service platform for locating, reserving, unlocking the bikes. For this case, the only device needed to communicate with core network is the device installed on the bike. The device is able to record the voice command, and is assumed to have 3GPP subscription. The user (i.e., the person who wants to ride the bike by speaking to the device) does not have 3GPP subscription, while he/she may have some user identification available at the bike company. The following steps are performed for the person who wants to ride the bike:

The person first verbally provides some indication to the shared bike through the voice input device, for example, "I am Tom, I want to ride this bike to go to Y Street."

The device installed on the shared bike records the voice, and transfers the voice message to the voice processing server in the network.

The Server receives the voice message and through the voice analysis recognizes that it is Tom and that he wants to use the shared bike, and the server sends a message to the bike to unlock the bike. The server may also send another voice message to the bike, for example, "the bike is unlocked," "this bike is broken, please choose another one," etc.

The bike is unlocked and sends a message to the Server to report the result. The bike may play the voice message received from the server.

Based on the two use cases described above (Smart Watch Use Case and Shared Bike Use Case), two problems can be identified as follows:

1) Authentication and authorization can be needed at different levels before any operations triggered by the voice input.

Network needs to authenticate and authorize not only the device which records the voice command for accessing the network, but also the person who speaks to the device with the voice commands.

At application level, the application server or the voice processing server needs to do authentication and authorization as well to make sure:

the person who inputs the voice command is the one who claims who he is, e.g., in shared bike use case, the voice input comes from Tom as the voice input claims.

the person has the rights to request the operations indicated in the voice command, e.g., in shared bike use case, Tom is a registered user for the shared bike service, and has enough money in his account to ride the bike.

This is especially critical for the cases such as shared bike service, since different persons may request to ride the bike via voice input. This implies that different users may use the same device, assuming that individual user does not have subscription with 3GPP network while the device has the subscription.

The secondary authentication and authorization of the voice input may be needed, after the network authenticates and authorizes the device that transfers the voice to access the network at first. However, there is no mechanisms defined so far in 3GPP to perform the secondary authentication and authorization regarding a voice input in addition to the regular authentication and authorization process for a UE to access the core network.

A voice command may request to contact another device that is different from the one recording the voice input, e.g., in smart watch use case, the person wants to send the photos to his phone when speaking to his smart watch. Therefore, the network needs to be able to identify the recipients and confirm with the original requestor, so that the network can communicate with the target recipient. This is especially critical in the scenario that the original requestor does not share subscription with or does not know the identifier of the target recipient.

Note that, although the use cases and problems discussed in this disclosure focus on how to deal with voice input into the 5GC, there are similar problems when the input is in other forms, such as finger print, videos, pictures, etc.

This disclosure focuses on the use cases where the input from UE to 5G network is a voice command. As previously discussed, this disclosure addresses two main problems: 1) secondary authentication and authorization for a specific user based on various types of inputs (e.g., voice, image, finger print, etc.), who may not have a 3GPP subscription; and 2) Method of identifying the target recipient which is not identified by processing the voice command. This disclosure proposes a 5G message service to transfer messages between UE and AF, or between two UEs. The message payload may include voice command, image, finger print, or video. Specifically, the following are proposed:

An overall architecture of a 5G message service to enable the message transfer in different forms (e.g., voice, image, video, etc.). Moreover, the control plane protocol stack and user plane stack are proposed respectively for a 5G message service.

A general procedure is presented to highlight several main procedures in a 5G network to deal with a voice input.

A method of secondary authentication and authorization procedure is proposed to authenticate and authorize a specific user who may not have a 3GPP subscription during the registration process.

A method of secondary authentication and authorization procedure is proposed to authenticate and authorize a specific user who may not have 3GPP subscription during the PDU session establishment process.

A method of delivering a message from a UE to another UE, including the procedure of identifying and confirming the recipient UE when the voice command involves a UE, whose identifier is not known to the network.

A subscription/notification model of message service is presented, where a 5G message broker is included in the 5G network.

In an exemplary embodiment, a UE performs one or more of:

Sending to a network, a request message including a voice command, which may come from different users.

Triggering a secondary authentication and authorization process regarding the user in the network in addition to identifying the device.

Receiving a response message from the network about the authentication and authorization results for identifying the user.

Sending to the network, a 5G message service request including another voice command from the identified user.

Triggering a secondary re-authentication and re-authorization process.

Triggering the delivery of a 5G message service message via the 5G network.

Receiving a response from the network.

In an exemplary embodiment, the request message may:

Contain various types of inputs, such as a finger print, an image, and a video.

Contain a 5G message service request message, which may include the following information: 5G MSG ID, 5G MSG reference ID, 5G MSG message type, voice processor ID, User ID, application information, IDs of 5G MSGF and 5G MSG GW.

In an exemplary embodiment, the network entity receiving the request can:

Identify the 5G MSG network functions to deliver the 5G message service for the UE.

Initiate a secondary (re-)authentication and (re-)authorization process to identify the user in network in addition to the UE.

Send a response to the UE about the results of the secondary (re-)authentication and (re-) authorization process.

Initiate the process in the network to identify the receiving UE.

In an exemplary embodiment, a network entity:

Receives a 5G message service request from a network entity which decides to trigger a secondary (re-)authentication and (re-)authorization process for a user.

Decides the types of payload encapsulated in the 5G message service message.

Identifies the processor to process various types of payload inputs, such as voice, finger print, image.

Sends a 5G message service message to the corresponding processor.

Sends a response to the triggering network entity, which forwarded the response to the UE.

In an exemplary embodiment, the network entity receiving the request can:

Send the 5G message service message through a control plane via NAS.

Send the 5G message service message through a conventional user plane, i.e., via UPF.

Send the 5G message service message through the extended SMS architecture.

Send a request message to a requestor UE and user for additional information to identify the receiving UE rather than the requestor UE.

Send a request message to the requestor UE and user to confirm the identified information of the receiving UE.

Act as a message broker to receive a subscription/publish from UE, and distributes notification to UEs based on the subscription information.

Architecture of 5G Message Service for Processing a Voice Command

Figure 7:
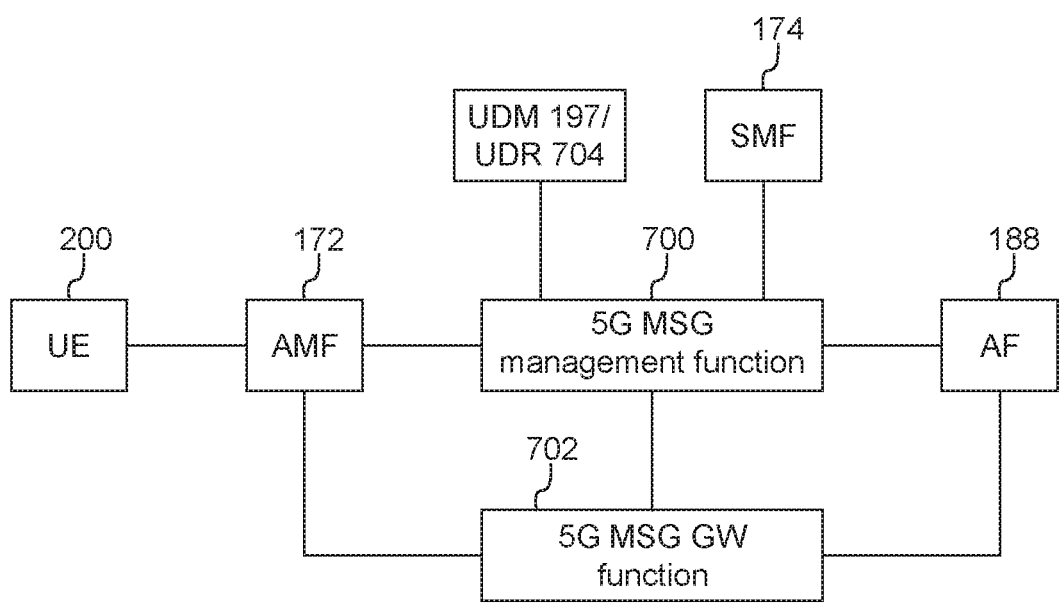
FIG. 7 shows an architecture of a 5G message service in a core network in accordance with an exemplary embodiment.

This disclosure provides a new 5G message service to transfer a voice input into UE, between the UE and a voice processor. FIG. 7 shows the architecture of a supporting 5G Message Service, where a new 5G MSG management function (5G_MSGF) 700 and 5G MSG gateway function (5G_MSG_GW) 702 are introduced. The 5G_MSGF 700 is responsible for managing control signaling about the 5G message service between the UE and the Application Servers, and between a UE and a UE. The 5G_MSG_GW 702 is responsible for user plane traffic transfer, i.e., carrying a 5G MSG message to/from a UE 200.

Another architecture option is to combine the 5G_MSGF 700 with the 5G_MSG_GW 702 as one network function, where the combined function implements all control plane and user plane functionalities, and connects to a UE 200 on top of a NAS connection, i.e., via the AMF 172.

Another option is that the 5G_MSGF 700 and the 5G_MSG_GW 702 can be implemented based on the existing 5GC architecture. Specifically, 5G MSGF 700 could be a part of a SMF 174 to deal with the control plane signal related to the 5G message service, while the 5G_MSG_GW 702 could be a part of a UPF 202 which is used as anchor point to forward traffic (i.e., 5G MSG message) from/to the UE 200. So that the 5G message service transfers the data via conventional user plane path to/from the UE 200, i.e., UPF-RAN node.

Another option is that 5G message service is implemented by extending the existing SMS architecture, where the functionality of 5G_MSGF 700 and 5G_MSG_GW 702 is implemented in SMS service center and SMS gateway MSC or SMS router.

A 5G message service can carry other forms of messages through 5GC, such as finger print, voice, image and video. For the voice input, the 5G_MSGF 700 sends the voice input to a voice processor server (i.e., AF 188), which could be inside or outside the 5GC.

FIG. 7 shows the case of 5G messaging service with an AF 188. NEF 196 may be involved when the voice processor (e.g., SCS/AS) is an external server. AF 188 shown in FIG. 6 is general, which could be application related function, or special processing function such as voice processor or image processor. Moreover, UDM 197/UDR 704 will store some 5G MSG related information. More details will be discussed in later section. 5G_MSGF 700 and 5G_MSG_GW 702 can be discovered by other network functions via NRF 206, which provides network function discovery capability. In an exemplary embodiment, both 5G MSG entities may need to register with NRF 206.

Note that, in this disclosure, the proposed methods of 5G message service includes the request/response model as well as the subscription/notification model, where a broker may be needed. Note that the proposed NF for 5G MSG could be implemented as a part of SMSF. In addition, the proposed 5G MSG entity may be combined with traditional SMS entity (e.g., SMSF or SMS service center) to facilitate the interworking between SMS and 5G SMG.

Figure 8:
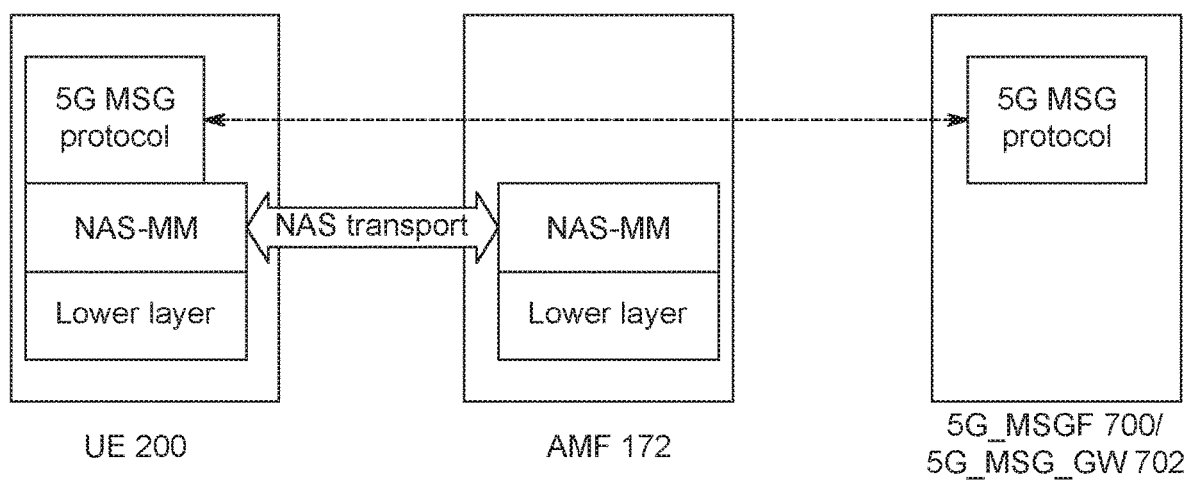
FIG. 8 shows a control plane protocol stack for a 5G message service in accordance with an exemplary embodiment.

FIG. 8 shows the control plane protocol stack for 5G MSG, where the 5G_MSGF 700 is responsible for control signaling of 5G message service, such as authentication/authorization and 5G message service registration/configuration. In addition, if the message is delivered through control plane, the 5G_MSG_GW 702 is responsible for delivering message to UE 200 via AMF 172.

Figure 9:
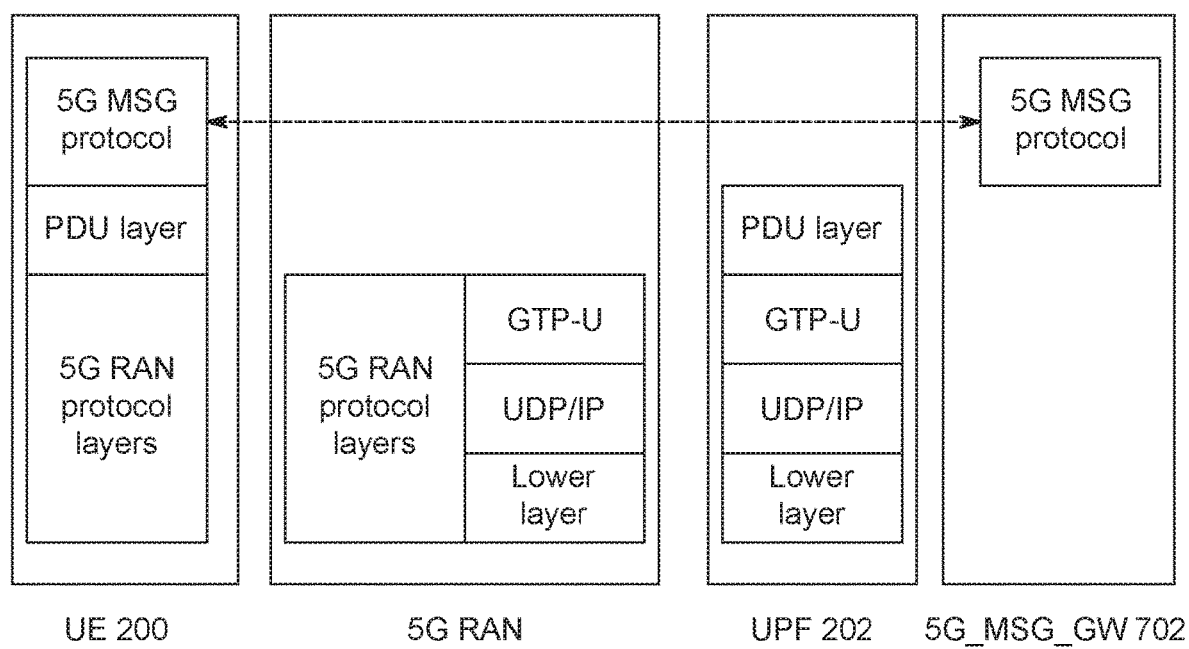
FIG. 9 shows a user plane protocol stack of a 5G message service in accordance with an exemplary embodiment.

FIG. 9 shows the user plane protocol stack built on the 5GC user plane, where the message is transferred to/from UE 200 through the path of 5G RAN and 5G_MSG_GW 702 via UPF 202. In this user plane option, the 5G_MSG_GW 702 function may be implemented in the UPF 202, where the UPF 202 is selected by SMF 174. Therefore, 5G_MSGF 700 could be a part of SMF 174.

General Procedure of Processing a Voice Command in a 5G Network

Figure 10:
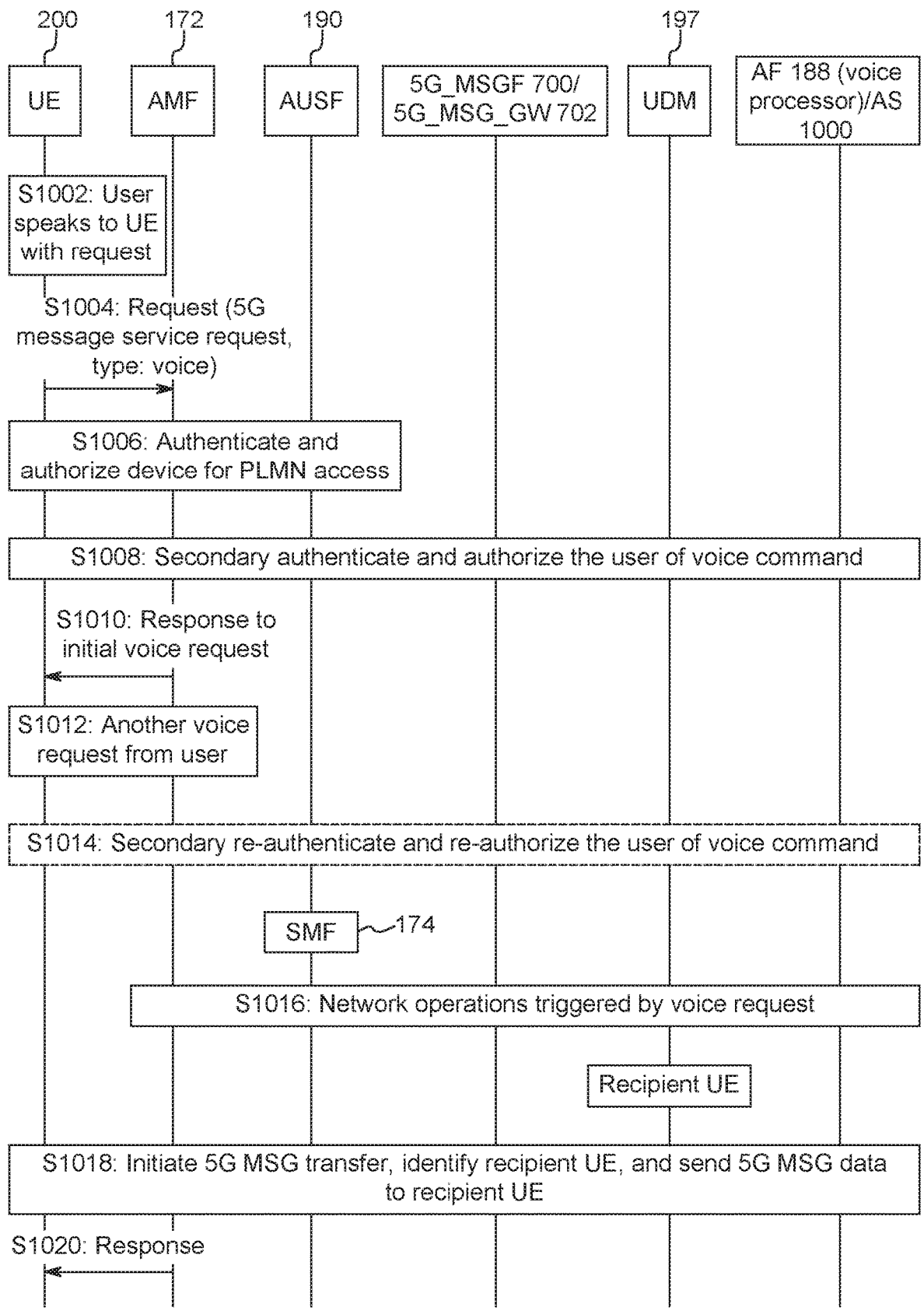
FIG. 10 shows a method of processing a voice input in accordance with an exemplary embodiment.

FIG. 10 shows a general procedure of processing the voice command within 5GC with the following steps:

Step S1002: a user speaks to a voice capable device (i.e., UE 200) to input his request. UE 200 is capable of recording the voice, connecting to the cellular network, and sending the voice to a voice processor via the mobile core network. It is assumed that the device has the network subscription, while the user does not.

Step S1004: UE 200 sends a request message to AMF 172 indicating it requests the 5G message service, and the message type is voice. There could be other types of message, such as image and video. Note that the call flow shows a general procedure, implying that the procedure may be applied to various types of core network procedures. For example, the request could be a registration request initiating a registration procedure, or PDU session establishment request to create a new PDU session. The following information will be included specific to 5G MSG and voice command:

Network slice information: could be requested, configured or allowed S-NSSAIs which UE 200 is requesting or assigned depending on the UE status. Moreover, this S-NSSAIs may indicate the network slice that supports 5G message service. There could be a dedicated network slice that supports the 5G message service.

Network slice instance ID: identify the network slice instance that previously serves the UE 200, if any.

UE ID such as 5G-GUTI, SUPI or 5G-TMSI to identify the UE 200.

UE device type: indicate what type of device the UE 200 is, such as voice assistance device and video recording camera. This can help core network to find appropriate server to process the payload in the message, such as voice.

AF ID: ID of the application server that the UE 200 wants to connect, i.e., establish a PDU session. In shared bike service use case, this is the application server maintained by the bike company, which will authenticate/authorize the user, and monitor the bike usage throughout the ride.

Network operation: for example, authentication/authorization, identify recipient ID, etc. In an exemplary embodiment, a 5G message service request is included in NAS message with the following information:

5G MSG ID: indicate the 5G MSG ID assigned to the UE 200 if UE 200 already registers with network as well as the 5G message service.

5G MSG message type: indicate the type of message payload, such as voice, image, finger print, video, etc.

5G MSG reference ID: an ID as reference to this 5G message transfer

ID of processor server: for example, UE 200 may indicate the voice processor IP address which will process the voice, in case the payload of the message includes a voice command.

5G_MSGF ID and 5G_MSG_GW IDs in case UE already registers with the 5G message service. These two entities will handle the message transfer.

Secondary authentication/authorization configuration: indicate if secondary authentication and authorization is needed for a specific user, and if secondary re-authentication and re-authorization is needed.

Application information: this is application information in the UE related to the application associated with the voice command to help connect to application server and data network. For example, the application is shared bike service in use case 2. This could be application ID.

User ID: identification information of the user issuing the voice command or providing a fingerprint, image, or video. The UE 200 may know this information from a prior exchange with the cellular network. This prior exchange may have been a registration, PDU session establishment, or Service Request, or any exchange that the network would have determined the identity of the user.

In the voice message example, it may be assumed that the voice message contains the user request (from Step S1002) and is also used to help identify the user and subsequently authenticate and authorize this user to perform the requested operation (for example, through some voice recognition at the Voice Processor Server). As an alternative, the UE 200 may provide a voice message that includes the input request, but may provide its user identity through one or more other mechanisms. Some of these mechanisms may include:

Fingerprint/palmprint of the user

Image of the user

Video of the user

Voice of the user (perhaps saying a standardized phrase, or his/her name)

Biometric reading of the user (e.g. retinal scan)

Identity of a cellular device that is owned by the user and in very close proximity to the user and the UE 200 (say in the user's purse or back pocket)

In such a case, the Request message in step 1 may additionally include:

User identifier type: the type of identifier (one or more from the list above), e.g., voice and finger print.

User Identification Information: the actual information to use to help identify the user (picture, voice sample, palm print, 5G-GUTI)

Identification Processor ID: the address of the server that is to process the User identifier information. It may be a voice processor server that will help authenticate and authorize the user. It may be fingerprint analysis server that will determine the User ID from the fingerprint image, etc. Note that this may be different from the Processor server, which interprets the voice message from the User.

Step S1006: the AMF 172 performs the regular authentication and authorization process with AUSF 190 and PCF 184 for the UE 200 to access the network.

Step S1008: Since UE 200 includes a 5G message service request in NAS message with a voice command, the network will initiate a secondary authentication and authorization process to verify that the voice is from a user who is allowed to access the network, and who has the rights to initiate the requested operations. More details of secondary authentication and authorization will be discussed in later texts.

Step S1010: after secondary authentication and authorization process completes, network will return a response to UE 200 indicating the result, either successful or failed. In addition to the result of authentication and authorization, the user ID may be included.

Step S1012: sometimes later, the user may have another command. Although the figure shows another voice command, it is not necessary that it is a voice command. The user may request via other forms, such as finger print.

Step S1014: the second command triggers a secondary re-authentication and re-authorization of the user in case that the user has another voice command, or use another type of input such as finger print. Re-authentication and re-authorization of the user is similar to step S1008, while it may be simpler, since the UE 200 can provide results of the first secondary authentication and authorization of the user, such as user ID. This is an optional step depending on whether operator wants to repeat the authentication and authorization with another input.

Step S1016: after re-authentication and re-authorization completes, the network will initiate the requested network operations involving core network and application server based on the results of processing 5G message, such as PDU session establishment.

Step S1018: network completes operations, initiates 5G message transfer, and identify the recipient UE. Note that the recipient UE may be different from the UE which sends request to network. For example, in the smart watch use case, the user finds the photos, and wants to send them to his cell phone, where the recipient UE is the cell phone. More details will be given below.

Step S1018: After the 5G message is delivered to the recipient UE, network sends a response to UE 200 indicating the requested operation is done.

FIG. 10 shows an example in which the 5G message carries the voice command. The voice processor may be inside or outside of the network. In case that the voice processor is an external application server, the core network will communicate with it via NEF.

Note that the general procedure in FIG. 9 can be applied to other forms of messages using 5G message service, such as finger print, image and video.

Secondary Authentication and Authorization of a Voice Command During Registration An exemplary embodiment provides a method of the secondary authentication and authorization during a registration process. The goal is to authenticate and authorize the user who initiated a voice request via a 5G message service. Note that the procedure described may be applied for a re-authentication and a re-authorization process.

Figure 11:
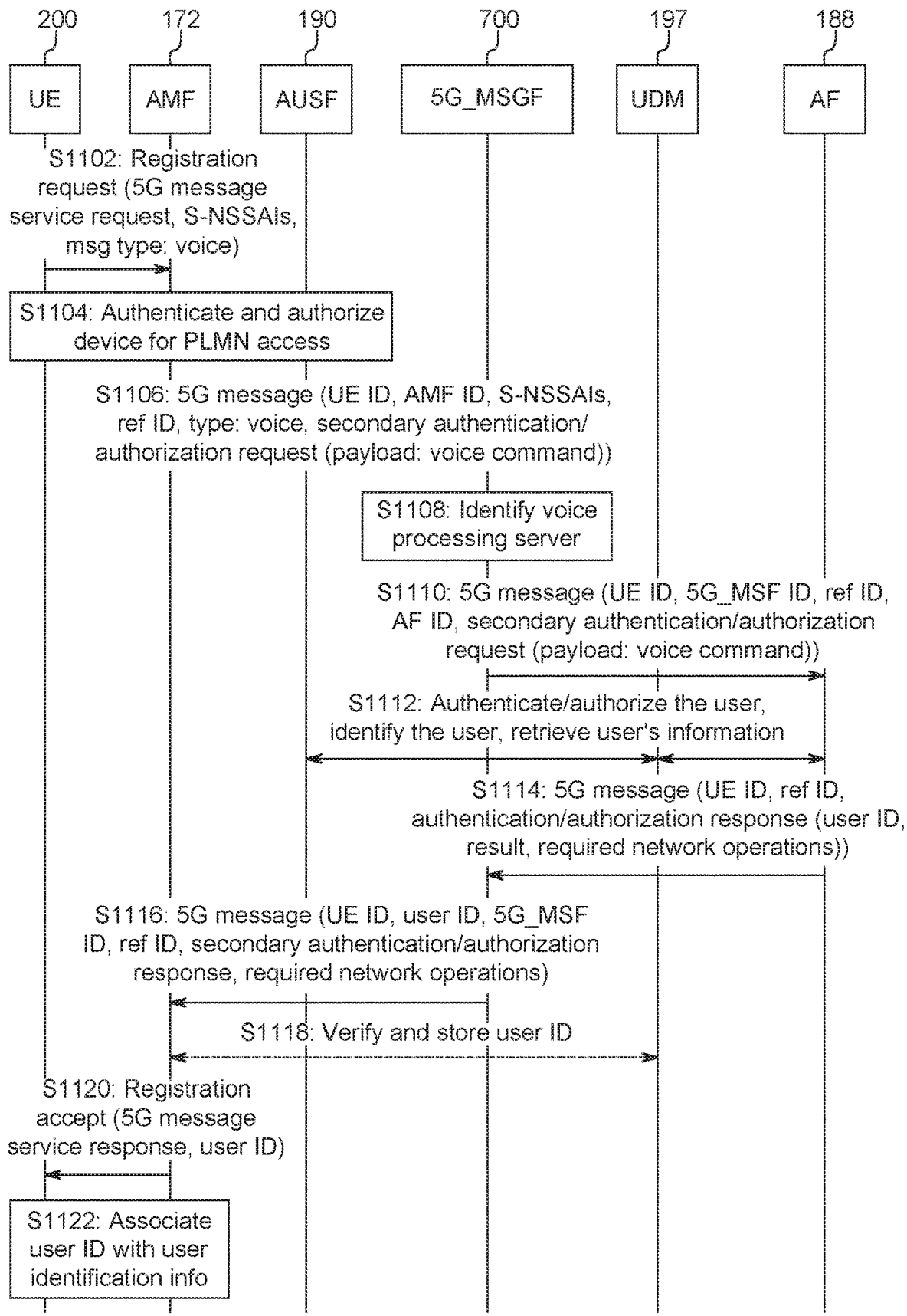
FIG. 11 shows a secondary authentication procedure and an authorization procedure for a voice inputted by a specific user in accordance with an exemplary embodiment during a registration procedure.

FIG. 11 shows the procedure with the voice command as an example. Note that the procedure shown in FIG. 11 can be applied to other forms of messages using 5G message service, such as finger print, image and video. The detailed steps are as follows:

Step S1102: UE 200 sends a registration request message to AMF 172, which includes a 5G message service request. The information included in registration request and 5G message service request is discussed in step 1 of FIG. 10.

Step S1104: AMF 172 initiates the regular authentication/authorization process for the UE 200.

Step S1106: after the UE 200 is successfully authenticated and authorized to access the network, AMF 172 forwards the 5G message service request to 5G_MSGF 700 by including a secondary authentication/authorization request for the user.

Note that, this may be a re-authentication/re-authorization request if a first secondary authentication/authorization process has been performed before. In this case, the user ID will be included, which allows the network to take a simpler procedure compared with the original secondary authentication/authorization process.

Step S1108: In case UE 200 does not specify ID of voice processor or Voice Processing Server, AMF 172 will contact UDM 197/UDR 704 to identify an appropriate voice processor based on application information (an application server may have a dedicated processing server), UE location, and UE subscription information. Other factors may be considered, such as 5G MSG capability and processing capability. Additional factors may include local network policies (for example, network 1 may always use the services of Server 1 for voice recognition).

Step S1110: 5G_MSGF 700 forwards the 5G message service request to the voice processor (i.e., AF 188). Note that AF 188 also represents the application server. For example, in a shared bike service use case, the bike company has an application server maintaining bike information, and all the user's profile and account information. The voice processor may communicate with the application server to verify the user.

Step S1112: AF 188 cooperates with AUSF 190 and UDM 197/UDR 704 to perform the secondary authentication and authorization in order to identify the user. Specifically, AF 188 obtains the voice print by processing the voice command, communicates with UDM 197/UDR 704 to get the user ID, and then communicates with AUSF 190 to authenticate and authorize the user. AF 188 may retrieve some other information of user from UDM 197/UDR 704 with the user ID, e.g., the user's preferred network slice, location of user, IDs of devices associated with the user such as cell phone, smart watch, device types of each device associated with the user ID, and the default data network the user connects to. As part of this step, the core network may decide to only authorize the user, if the user and the UE 200 are in relative proximity (for example, in the same cell or tracking area).

In some cases, the user may not be known to the cellular network. In such a case, the user may have an agreement with the AF 188 to have the AF 188 sponsor any data transmissions to/from this user that are transmitted via the UE 200. It may update the sponsored data policy for the UE 200. It may also assign a User ID to this user.

Step 7: voice processor returns the results to 5G_MSGF 700 with a 5G message response, including the following information:
  Reference ID for this 5G message request/response
  AMF ID
  Secondary authentication and authorization response including the results, i.e., whether the process is successful or not, user ID, and some other user information mentioned above.
  Payload type indication to indicate if there is any payload included in the message, and the type of payload. Such payload could be a voice command, or voice notification to the user saying that the user is successfully authenticated and authorized, and the bike is unlocked.

Step 8: 5G_MSGF forwards the response to AMF 172.

Step 9: optionally, AMF 172 may store the user ID in the UDM 197/UDR 704 if the user registers with network for the first time.

Step 10: AMF 172 further returns the registration response to UE 200 including the 5G message service response.

Step 11: UE 200 may store the association between the User Identification Information and the received User ID. This may be used for future accesses from the user.

Note that Step S1108 and Step S1110 assume that the User Identifier Type is 'voice,' and as a result a voice processor is used to help identify the user. Alternatively, if the User Identifier Type is other that 'voice,' Step S1108 and S1110 could involve interactions with some other identification server.

Secondary Authentication and Authorization of a Voice Command in PDU Session Establishment As discussed above, it is possible that the secondary authentication and authorization will be initiated by SMF 174 when the UE 200 requests to establish a new PDU session. For example, in the shared bike service use case, the device installed on the bike may already register with network without establishing a PDU session. When a user wants to use the bike, the network needs to authenticate and authorize the user first, and create a new PDU session for transferring data (e.g., location and bike speed) during its ride.

This section presents the procedure of secondary authenticating and authorizing the user who requests via voice during the PDU session establishment procedure. There are two options for network to transfer the voice to the processing server: 1) use a 5G message service to transfer the voice command to the voice processing server; and 2) use the UPF 202 to transfer the voice command to the voice processing server.

Note that the procedure described in this section can be applied to other forms of messages using a 5G message service, such as finger print, image and video. The detailed steps are as follows in FIG. 12:

Step S1202: UE 200 sends a PDU session establishment request to AMF 172. UE 200 will include the following information:
  S-NSAAIs that are assigned to UE 200 during registration process as well as the network slice that support 5G message service.
  PDU session ID, which identifies the to-be-created session for the user
  5G message service request is included in NAS message with the following information:
    5G MSG ID: indicate the 5G MSG ID assigned to the UE 200 if UE 200 already registers with network as well as the 5G message service.
    5G MSG message type: indicate the type of message payload, such as voice, image, finger print, video, etc.
    5G MSG reference ID: an ID as reference to this 5G message transfer
    ID of processor server: for example, UE 200 may indicate the voice processor IP address which will process the voice, in case the payload of the message includes a voice command.
    5G_MSGF ID and 5G_MSG_GW IDs in case UE already registers with the 5G message service. These two entities will handle the message transfer.
    Secondary authentication/authorization configuration: indicate if secondary authentication and authorization is needed for a specific user, and if secondary re-authentication and re-authorization is needed.
    Application information: this is application information in the UE related to the application associated with the voice command to help connect to application server and data network. For example, the application is shared bike service in use case 2. This could be application ID.
    User ID: Information for the user issuing the voice command or providing a fingerprint, image, or video. The UE 200 may know this information from a prior exchange with the cellular network. This prior exchange may have been a registration, PDU session establishment, or Service Request, or any exchange that the network would have determined the identity of the user.

Alternatively, the UE 200 may provide the voice command in the PDU Session Establishment request, but may not provide the user identity through one or more other mechanisms. Some of these mechanisms may include:
  Fingerprint/palmprint of the user
  Image of the user
  Video of the user
  Voice of the user (perhaps saying a standardized phrase, or his/her name)
  Biometric reading of the user (e.g. retinal scan)
  Identity of a cellular device that is owned by the user and in very close proximity to the user and the UE 200 (say in the user's purse or back pocket)

In such a case, the PDU Session establishment request in step S1202 may additionally include:
  User identifier type: the type of identifier (one or more from the list above)
  User Identification Information: the actual information to use to help identify the user (picture, voice sample, palm print, 5G-GUTI)
  Identification Processor ID: the address of the server that is to process the User identifier information. It may be a voice processor server that will help authenticate and authorize the user. It may be fingerprint analysis server that will determine the User ID from the fingerprint image, etc. Note that this may be different from the Processor server, which interprets the voice message from the User.

Step S1204: upon receiving the PDU session establishment request, AMF 172 will select a SMF 174, which is capable of communicating with 5G MSGF 700.

Step S1206: AMF 172 sends the PDU session establishment request to the selected SMF 174.

Step S1208: in case the 5G_MSGF 700 or voice processor is not specified in step S1202, SMF 174 contacts NRF 206 or UDM 197/UDR 704 to find 5G_MSGF 700 and an appropriate voice processor considering the following factors:

Application information, e.g., an application server may have a dedicated processing server
      UE location
      UE subscription information
      5G MSG capability
      Processing capability Additional factors may include local network policies (for example, network 1 may always use the services of Server 1 as its default Voice processor).

Option 1: use 5G MSG to reach voice processor

Step S1210a: SMF 174 forwards the 5G message service request to 5G_MSGF 700. Since it is indicated that a voice command is included, and/or the request includes Secondary authentication/authorization configuration details, the SMF 174 will include a secondary authentication and authorization request in order to authenticate and authorize the user.

Step S1212a: 5G_MSGF 700 forwards the message to the voice processor (i.e., AF 188). Note, AF 188 also represents the application server. For example, in shared bike service use case, the bike company has an application server maintaining bike information, and all the user's profile and account information. The voice processor may communicate with the application server to verify the user.

Step S1214a: voice processor processes the voice command, authenticate/authorize the user with assistance of AUSF 190, retrieve user information from UDM 197/UDR 704, such as user ID, the user's preferred network slice, location of user, IDs of devices associated with the user such as cell phone, smart watch, device types of each device associated with the user ID, and the default data network the user connects to. As part of this step, the core network may only authorize the user, if the user and the UE 200 are in relative proximity (for example, in the same cell or tracking area).

In some cases, the user may not be known to the cellular network. In such a case, the user may have an agreement with the AF 188 to have the AF 188 sponsor any data transmissions to/from this user that are transmitted via the UE 200. It may update the sponsored data policy for the UE 200. It may also assign a User ID to this user.

Step S1216a: AF 188 (i.e., voice processor) replies 5G_MSGF 700 with the secondary authentication and authorization results, user ID, reference ID. This may also include details about the secondary authentication and authorization of the user. For example, the AF 188 may tell the UE 200 that the secondary authentication and authorization may be restricted to a certain period of time (e.g. have a time limit), may be restricted to a certain location (e.g. only be valid in certain cells or tracking areas), may need re-authentication/re-authorization for every voice command. In addition, the AF 188 may tell the UE 200 that for subsequent voice commands, the UE 200 may perform re-authentication/re-authorization on behalf of the AF 188.

Step S1218a: 5G_MSGF 700 forwards the response to SMF 174.

Option 2: use UPF 202 to reach voice processor

Step S1210b: in this option, 5G MSG message is delivered via UPF 202, i.e., the conventional user plane. SMF 174 selects a UPF 202 based on the voice processor information.

Step S1212b: N4 session establishment request/response is exchanged between SMF 174 and UPF 202 to create a PDU session.

Step S1214b: SMF 174 sends the secondary authentication and authorization request to voice processor via UPF 202.

Step S1216b: similar to step S1214a, voice process processes the voice command, authenticate/authorize the user with assistance of AUSF 190, retrieve user information from UDM 197/UDR 704.

Step S1218b: voice processor returns the response to SMF 174 via UPF 202 with the secondary authentication and authorization results, user ID, AF ID.

Step S1220: optionally, SMF 174 may store the user ID in the UDM 197/UDR 704 if the user registers with network for the first time.

Step S1222: SMF 174 returns the PDU session establishment response to UE 200 via AMF 172.

Figure 12:
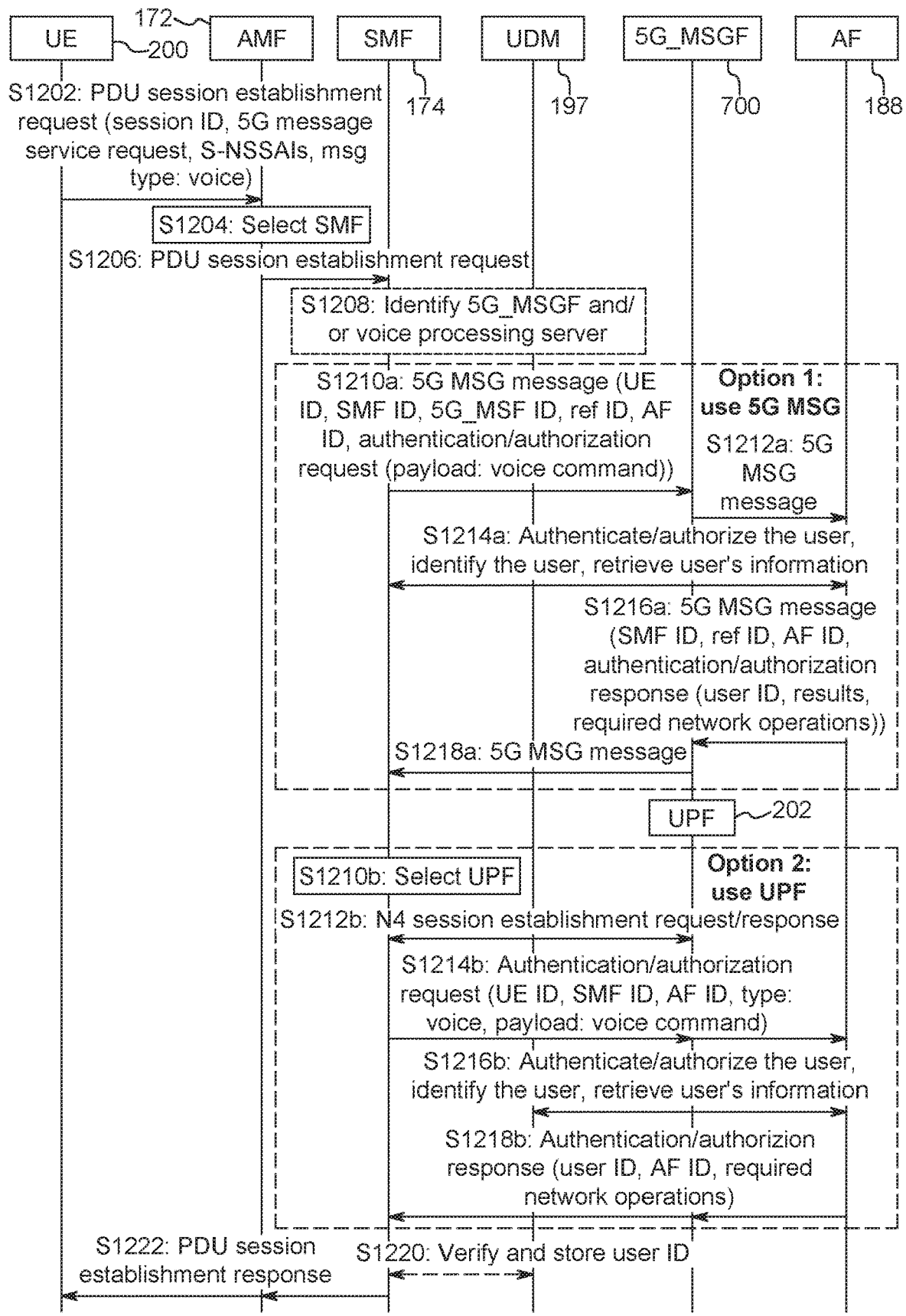
FIG. 12 shows a secondary authentication procedure and an authorization procedure for a voice inputted by a specific user in accordance with an exemplary embodiment during a PDU session establishment.

The procedure shown in FIG. 12 could be also triggered by the service request procedure. Specifically, the device on the bike is in CM-IDLE state while remaining registered with network. When a person requests to ride the bike by speaking to the device, the device will send a service request message to network, and indicate a voice input is included. Consequently, AMF 172 will initiate the secondary authentication and authorization procedure for a specific user. The PDU session establishment procedure may be triggered as a part of service request procedure if the device requests to do so.

The procedure shown in FIG. 12 considers the case that the session is created through the user plane. In case of control plane PDU session, AMF 172 will be responsible for initiating the authenticating and authorization process for the specific user using either the 5G message service or NEF 196 to reach the voice processing server.

An alternative to the option that uses UPF 202 is to use the NEF 196 to reach the voice processing server. In other words, SMF 174 may send secondary authentication and authorization request to AF 188 via NEF 196, and won't select UPF 202 and establish the PDU session until the authentication and authorization is successfully completed.

Another possible scenario is that the UE 200 (i.e., device installed on the bike) has a PDU session ready, which connects to a voice processor. Once the user requests something to the UE 200 via voice, the UE 200 will pack the voice request, and send the packet to the voice processor along the PDU session. The UE 200 may include a secondary authentication and authorization request within the PDU packet, indicate that there is voice command, and the goal is to verify the user.

In subsequent voice commands by the user, the UE 200 may check that the secondary authentication/authorization is still valid. For example, UE 200 may check one or more of:

that the secondary authentication/authorization has not expired,
    that the user and/or UE 200 is still in the allowed cells or tracking area,
    that the user is not needed to re-authenticate/re-authorize for every voice command, and
    if the UE 200 is allowed to perform secondary authentication/authorization on behalf of the AF 188. For example, the UE 200 may verify that the fingerprint for this subsequent voice command still matches the fingerprint used in the voice command when the initial secondary authentication/authorization was performed.

In the above call flow, it is assumed that the User Identifier Type is 'voice', and as a result a voice processor is used to help identify the user. Alternatively, if the User Identifier Type is other that 'voice,' the call flow would involve interactions with some other identification server.

Methods of Identifying and Confirming a Target Recipient

In the smart watch use case, the user speaks to the watch to find the photos, and send them to his cell phone. It can be seen that the cell phone is not involved until the photos are found and ready to be sent. However, the network does not know how to reach the cell phone, since neither the person nor the watch indicates any identifier of the cell phone to the network.

Figure 13:
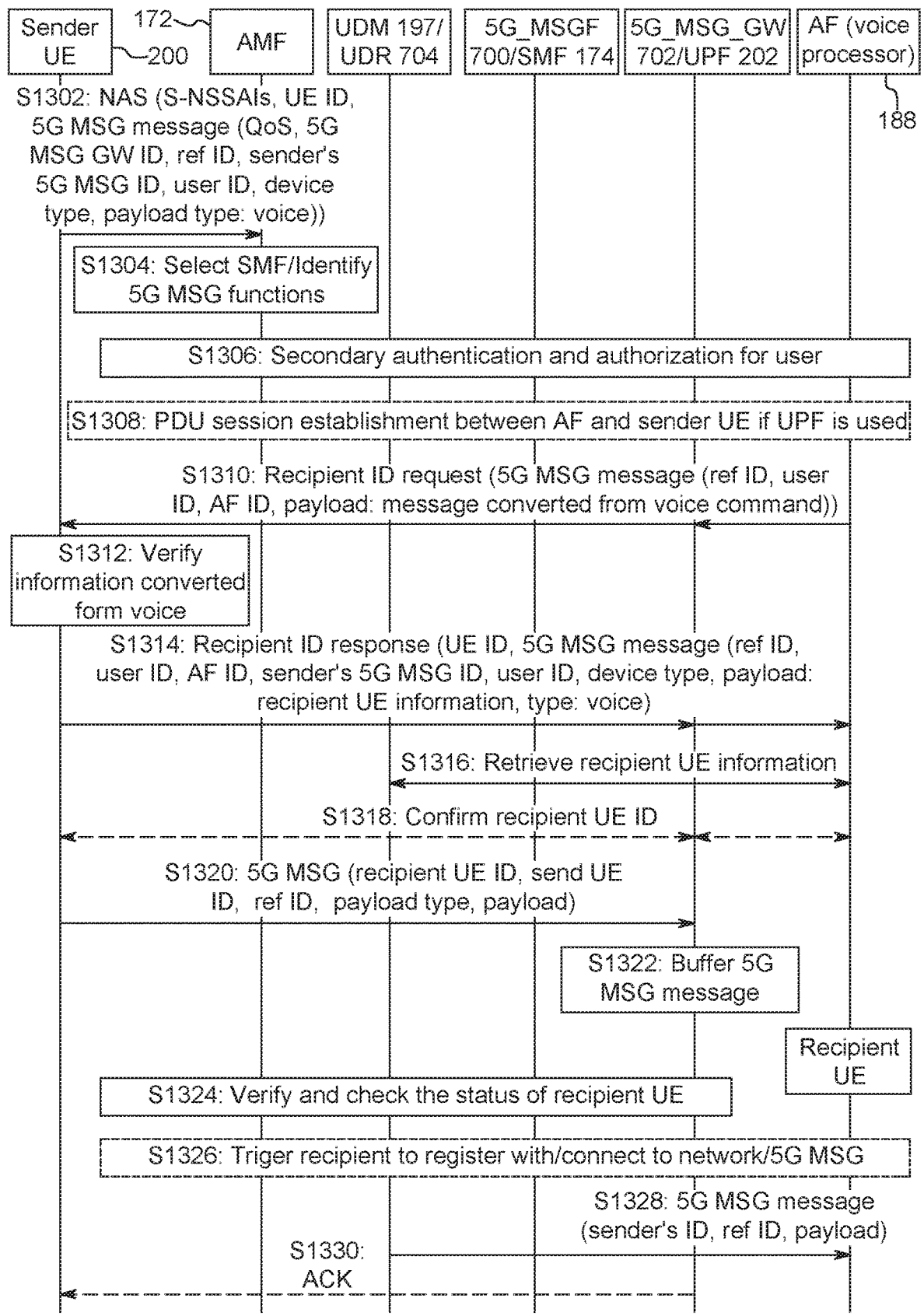
FIG. 13 shows a method of identifying a recipient UE for transferring information using a 5G message service.

An exemplary embodiment provides a method on how the network identifies the recipient UE given a voice command. Note that the procedure described in this section can be also applied to other forms of messages using a 5G message service, such as finger print, image and video. FIG. 13 shows the details with the following steps:

Step S1302: UE 200 sends a NAS message to AMF 172, which may contain the following information:

S-NSSAIs: identify network slice that is serving the UE 200

UE ID

Device type of the UE 200

Voice processor ID

5G MSG message including the following parameters:

User ID if any

QoS for 5G MSG message delivery: indicate the level of QoS needed/desired for the coming message transfer, e.g., deliver once without acknowledgement, guaranteed successful delivery.

UE's 5G MSG ID

5G MSG entity ID, i.e., ID of 5G MSGF and 5G MSG GW

5G MSG Reference ID

5G MSG Message payload type: voice, could be other types, such as finger print, image and video Application information Step S1304: AMF 172 selects SMF 174 or identifies 5G MSG entities if the UE 200 does not specify those 5G_MSGF 700 and 5G_MSG_GW 702. In order to find 5G MSG entities, AMF 172 may initiate network function discovery at NRF 206. It is advantageous that 5G_MSGF 700 and 5G_MSG_GW 702 register with NRF 206, so that they are discoverable for other network functions within the 5GC.

Step S1306: secondary authentication and authorization is performed to verify the user. The details are described above in the sections entitled "Secondary Authentication and Authorization of a Voice Command during Registration" and "Secondary Authentication and Authorization of a Voice Command in PDU Session Establishment."

Step S1308: in case that UPF 202 is used to transfer the 5G MSG message, i.e., 5G MSG is transferred through conventional user plane path, PDU session establishment procedure is performed.

Step S1310: voice processor sends 5G MSG message to the sender UE for requesting the recipient UE information. This is because the voice processor finds that the voice command requests to involve another device in communication, while the identification of the recipient is not provided, and not unknown to the network. The message includes information converted by the voice processor from the voice command. The message is forwarded by UPF 202 or 5G_MSG_GW 702.

Step S1312: upon receiving the message, sender UE verifies the converted information.

Step S1314: sender UE sends a response to AF 188 with information of recipient UE in the form of voice. This could be also in other forms, such as text or finger print.

Step S1316: the voice processor processes the second voice input, and contacts UDM 197/UDR 704 to retrieve more information about recipient UE, such as user ID, SUPI, subscription information. Moreover, the UDM 197/UDR 704 may store some user information associated with the user ID, for example, device ID (i.e., 3GPP defined IDs), device type, preferred network slice information. UDM 197/UDR 704 can look for any of device associated with the user ID.

Step S1318: optionally, the voice processor confirms the recipient UE identification with the sender UE.

Step S1320: the sender UE sends the 5G MSG message to UPF 202/5G_MSG_GW 702 to deliver the actual data. For example, in the smart watch case, the sender UE (i.e., user) may include the command to the air conditioner (i.e., recipient UE) for setting up the air conditioner.

Step S1322: once UPF 202/5G_MSG_GW 702 gets the 5G MSG message from sender UE, it may buffer the message.

Step S1324: network initiates a process to check the status of the recipient UE with AMF 172, SMF 174 and UDM 197/UDR 704.

Step S1326: if the recipient UE is not registered with network, or in IDLE mode, the network will trigger the recipient UE to initiate a process to register with or connect to the network.

Step S1328: once the recipient UE is ready to receive the 5G MSG message, UPF 202/5G_MSG_GW 702 forwards the buffered message to the recipient UE.

Step S1330: optionally, UPF 202/5G_MSG_GW 702 sends an acknowledgement to sender UE to confirm that the message is delivered to the recipient UE successfully.

Subscription/Notification Model for 5G Message Service

In addition to the request/response model, a message service usually provides the subscription/notification model, which, in an exemplary embodiment, may need a message broker. An exemplary embodiment of the present disclosure implements a 5G message broker in the network for the 5G message service.

In an exemplary embodiment, the 5G_MSGF 700 can be the message broker for distributing a message to the UEs and/or application servers. A UE 200 can subscribe to a certain event/topic, publish information, and receive the notification message based on a subscription based on the protocol stack shown in FIG. 7. In other words, the message subscription and distribution are done through the control plane, i.e., via AMF NAS.

An alternative embodiment is that all of the above operations are done via the user plane. The UE 200 subscribes to a certain type of message, publishes any message to the broker and receives the notification via 5G MSG_GW 702.

For enabling the subscription/notification model, the following additional information will be defined inside the 5G MSG message:

Subscription ID: this is used to identify a subscription in case a UE 200 subscribes to a certain type of message or certain type of event. It is also possible that a UE 200 subscribes to all messages that are coming from a set of UEs, e.g., a cell phone gets data from a set of sensors.

Message type: indicate if this message is to subscribe to or publish a message from a UE 200 to a broker. It could be a notification from a broker to a UE 200.

Type of topic, event or message: indicate to which type of topic, event or message a UE 200 subscribes, or a UE 200 publishes (for example, an event ID).

Schedule of subscription: indicate in which time period the subscription is valid.

Discovery and Registration to 5G Message Service

Figure 14A:
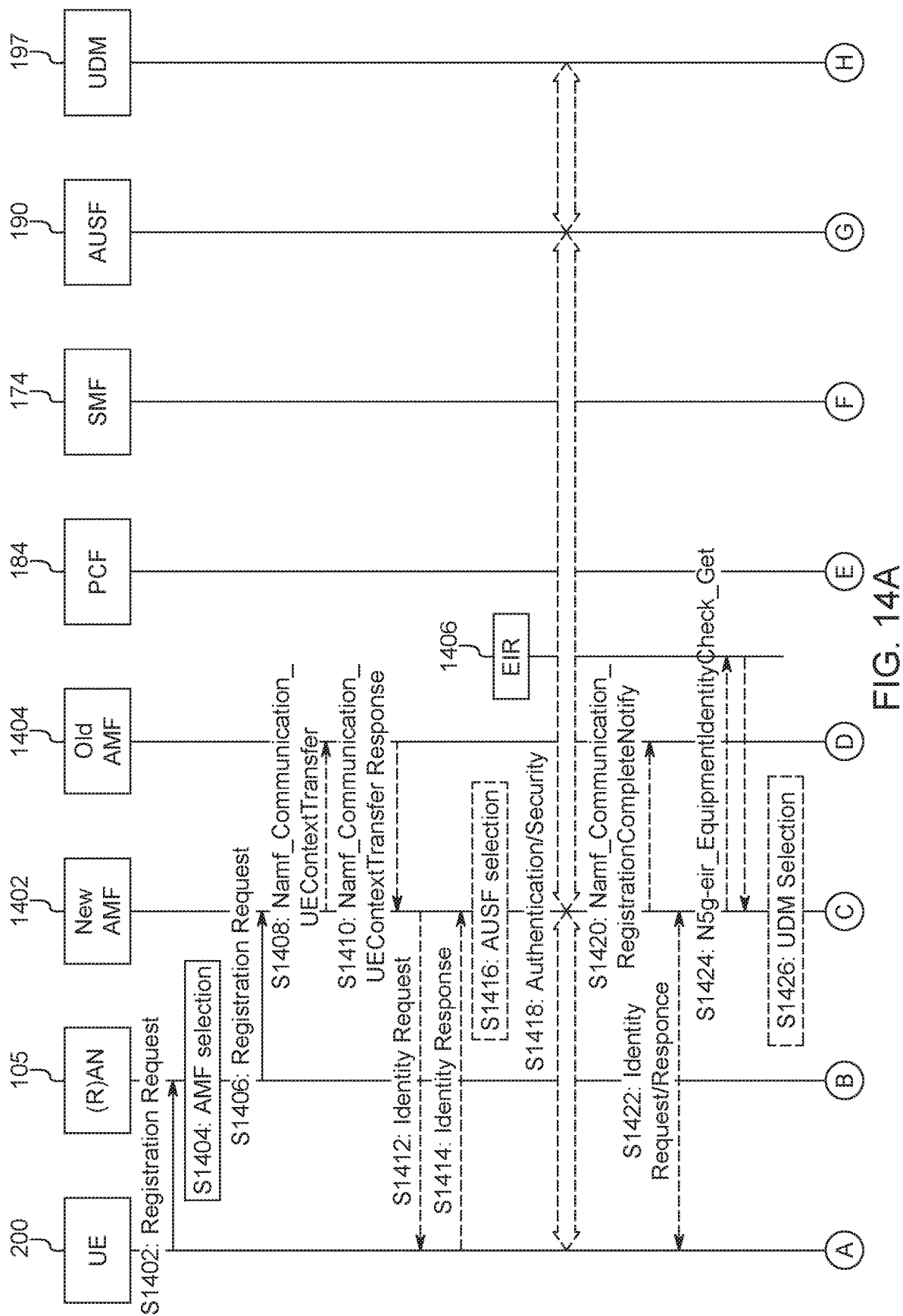
FIGS. 14A-14C show a general registration procedure.
Figure 14B:
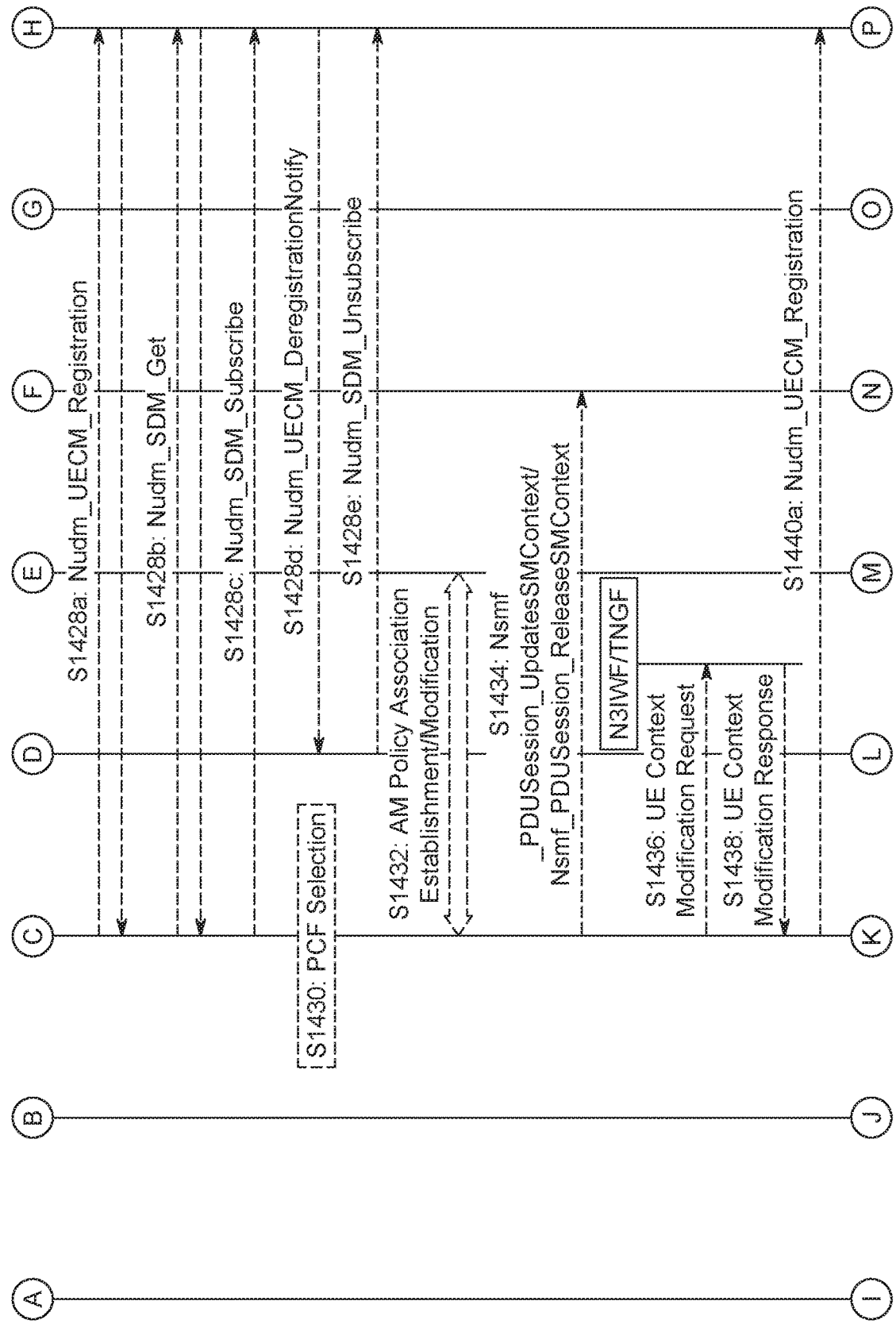
Figure 14C:
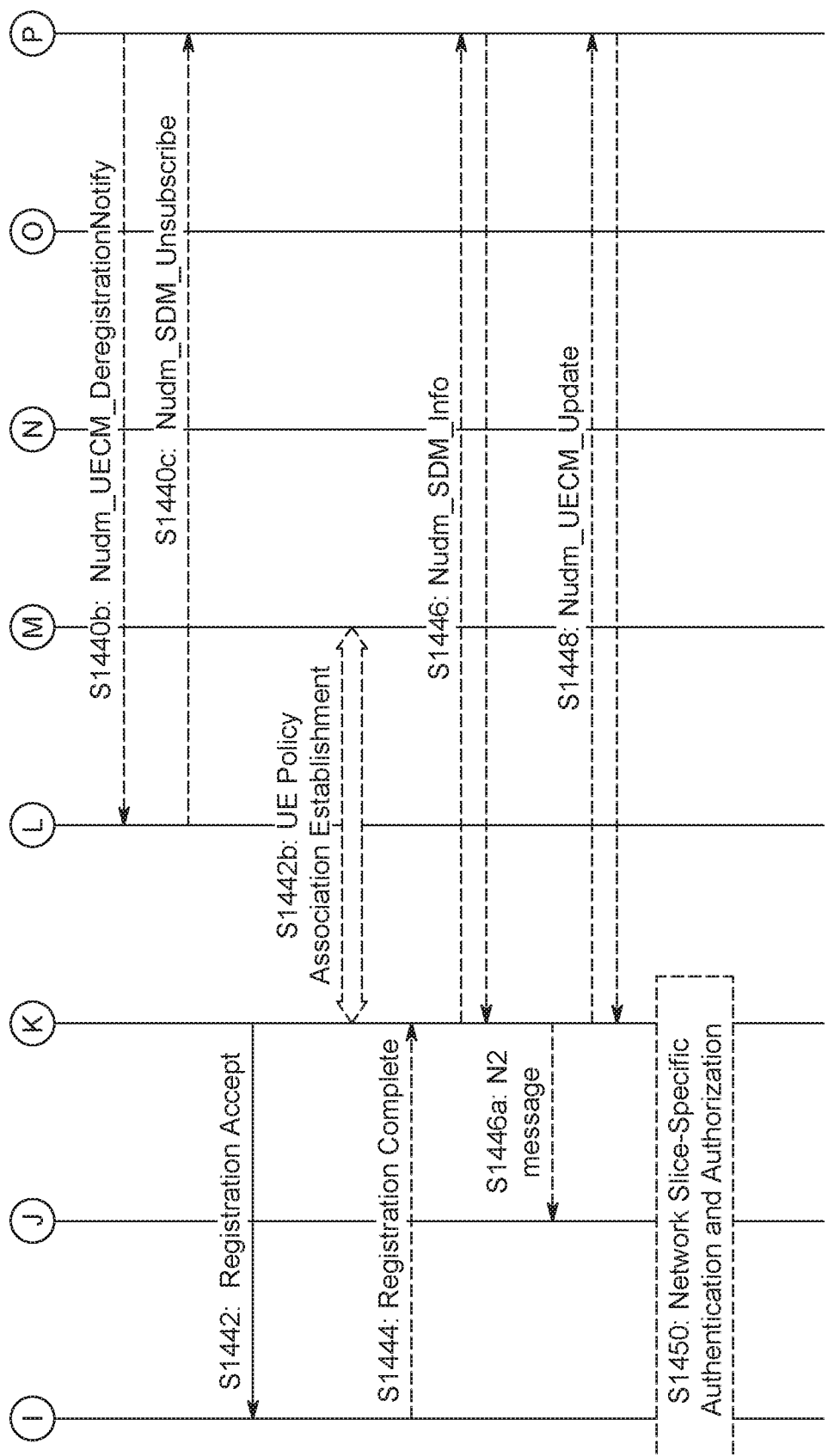

In order to use the 5G message service, a UE 200 needs to first discover whether the 5G MSG service is available in the 5GC, and then get authorization from the network to use the service through registration or registration update process. The UE 200 can utilize the general registration procedure as shown in FIGS. 14A-14C to determine whether 5G MSG service is available and to request to be authorized for the service if it is available. The following steps can be changed in the registration procedure in order to allow for the discovery of the 5GMSG service.

Step S1402: in the registration request, the UE 200 can indicate its desire to use the 5G MSG service by specifying the following information:

An identity or an address of the 5G MSG NF that it wants to use—the UE 200 may have been pre-provisioned with this address or may have communicated with an application server to derive the 5G MSG NF through application layer procedure prior to this registration procedure.

An indication that the UE 200 requests to register to the 5G MSG, i.e., authorized to use the 5G MSG. If UE 200 does not provide any information about 5G MSG NF, then the network will trigger a discovery procedure to find the available 5G MSG NF, followed by the 5G MSG registration process for the UE 200.

An indication of which slices (S-NSSAI) it desires to use to communicate with the 5GMSG service.

An indication that the UE 200 requests to discover a 5G MSG NF if UE 200 does not know if a 5G MSG service is available or does not have any information about 5G MSG NF.

This indication may be provided per S-NSSAI.

Message models that the UE 200 wants to use when using the 5G MSG service, such as unicast, broadcast and/or group message delivery.

Identifiers that were previously assigned to UE 200 for using the 5G MSG service. For example, an MSISDN for SMS, a URI for IP based communication, a DNN for Non-IP Communication.

The UE's preferred method of transferring the 5G MSG message (i.e., transport protocol), e.g., SMS over NAS, NIDD over NAS, via user plane, or through traditional SMS system. It is possible that different types of message models could be delivered through different methods. For example, broadcast message will be delivered via SMS over NAS, while unicast message from an AS will transferred to UE 200 by NIDD over NAS via NEF 196. Moreover, different transport protocols may be used depending on the type of payload (e.g., text, voice, video and image) and QoS requirement.

Step S1406: The RAN node forwards the registration request to AMF including the new information included in step S1402.

Steps S1408 and S1410: in case that a new AMF 1402 is used, the new AMF 1402 will include the 5G MSG indication to request information about the usage of 5G MSG for the UE 200. Correspondingly, the old AMF 1404 may reply with one or more of the information highlighted in step S1402. Steps S1412 and S1414: if the SUCI is not provided by the UE nor retrieved from the old AMF, the Identity Request procedure is initiated by AMF sending an Identity Request message to the UE requesting the SUCI. The UE responds with an Identity Response message including the SUCI. AMF selects an AUSF in step S1416 and initiates the authentication and security process in step S1418. In step S1420, the new AMF notifies the old AMF that the registration of the UE in the new AMF is completed by invoking the Namf_Communication_RegistrationCompleteNotify service operation. In step S1422, AMF sends an Identity Request message to the UE to retrieve the PEI. In step S1424, the new AMF initiates ME identity check by invoking the N5g-eir_EquipmentIdentityCheck_Get service operation. In step S1426, the new AMF, based on the SUPI, selects a UDM, then UDM may select a UDR instance.

Step S1428: as UE indicates the intention to discover or register to 5G MSG, the AMF may include the query of the related subscription information in the request message to UDM 197, so that UDM 197 will return the subscription information, such as whether UE 200 is allowed to use 5G MSG, which delivery method or type of message UE can use (e.g., SMS over NAS, only broadcast emergency message, or subscription/notification functionality), default serving 5G MSG NF identity. In step S1430, the AMF selects a PCF. In step S1432, new AMF performs an AM Policy Association Establishment/Modification with the selected PCF.

Step S1434: if UE is authorized to use the 5G MSG in previous steps, AMF would ask SMF 174 whether an existing PDU session (e.g., IP type via UPF 202, or non-IP type via NEF/UPF 202) for the UE 200 can be used to deliver the 5G MSG message in case that UE 200 indicates it prefers to using UP path to send/receive a 5G MSG message. The AMF will provide the following information:

PDU session ID of the existing session that can be used to deliver message

Delivery method (transport protocol), e.g., NIDD via NEF, SMS over NAS.

Address or identity of the 5G MSG NF serving the UE 200

Identifiers that are assigned to UE 200 for using 5G MSG. The identifier may be an external ID that is assigned by a SCS/AS in case that the 5G MSG server is a 3rd party AS. Therefore, the 5G MSG NF is responsible to keep the mapping between this external ID and the UE ID (e.g., 5G-GUTI, SUPI).

Expected type of message, such as video, text, voice.

Expected data rate, or frequency of the 5G MSG message

Expected reliability for delivering the message, e.g., acknowledgement is required.

Geographic area in which 5G MSG serves the UE 200 and corresponding transport protocol.

SMF 174 determines whether to establish a new session or update an existing session to deliver the message for UE 200 based on the above information. In step S1436, if the new AMF and the old AMF are in the same PLMN, the new AMF sends a UE Context Modification Request to N3IWF/TNGF. In step S1438, N3IWF/TNGF sends a UE Context Modification Response to the new AMF. In step S1440, new AMF notifies UDM about the registration of UE and the old AMF notifies the UDM about the deregistration of the UE respectively.

Step S1442: In the registration accept message, AMF 172 sends the following information to UE 200 regarding the 5G MSG Service, the following information may be provided per 5G MSG instance:

An S-NSSAI that can be used to communicate with the 5G MSG instance.

Whether UE 200 is authorized to use the 5G MSG NF if UE indicates in step S1402 that it wants to register to 5G MSG.

Address or identity of the 5G MSG NF that will serve the UE 200 in case that UE 200 does not know such information or UE 200 indicates that it wants to discover a 5G MSG NF in step S1402.

Identifiers (e.g., general UE ID such as 5G-GUTI and SUPI, or ID that is assigned by 5G MSG NF and will be used within 5G MSG system) that are assigned to the UE 200 for the 5G MSG NF. In particular, the UE 200 may be provided with multiple contact addresses and port numbers for the Message Service, one for each transport that can be used to send messages to the service (e.g. an MSISDN for SMS, a URI for IP based communication, a DNN for Non-IP Communication).

Preferred transport protocol that will be used to deliver messages.

Geographic area where the UE 200 will receive 5G MSG messages and corresponding transport protocol.

Allowed S-NSSAI to which UE 200 is connected to for 5G MSG

List of subscribe-able events or message types such as a warning message within a local area, a critical network congestion occurs preventing some network service, a specific application server starts closer to the UE 200. Information of an existing PDU session (e.g., session ID, UPF address or ID, QoS flow ID) that will be used for 5G MSG message delivery. This information will be determined by SMF 174, and forward by AMF to the UE 200. In step S1444, UE sends back a registration complete message to the new AMF when it has successfully updated itself after receiving registration accept. In step S1446, the AMF provides the UE acknowledgement to UDM using Nudm_SD-M_Info. In addition, For Registration over 3GPP Access, if the AMF does not release the signalling connection, the AMF sends the RRC Inactive Assistance Information to the NG-RAN. In step S1448, AMF sends a UE context update message to UDM. In step S1450, if the UE indicates its support for Network Slice-Specific Authentication and Authorization procedure in the UE MM Core Network Capability in Registration Request, and any S-NSSAI of the HPLMN is subject to Network Slice-Specific Authentication and Authorization, the related procedure is executed.

Note that if new AMF 1402 as shown in FIGS. 14A-C is not be able to find a network slice that supports 5G MSG, it may query the NSSF for help to identify such a network slice and corresponding network slice instance. If AMF does not know any 5G MSG NF, it will contact NRF 206 to discover a 5G MSG NF during the registration process.

If a UE/user is required to have an additional authentication and authorization to utilize 5G MSG service, it may be conducted during the establishment of each PDU session. The authentication and authorization may be specific to the network slice supporting the 5G MSG, or to the 5G MSG server as an AS that supports the 5G MSG. The 5G MSG NF could implement the functionality of 5G_MSGF 700, 5G_MSG_GW 702, or combination of both.

It is worth noting that network may also initiate the discovery and registration of 5G MSG process for a UE 200. This could be triggered by the events such as network wants to send some emergency warning message through 5G MSG, an external server wants to send a message (e.g., text, video or voice) to UE 200 using 5G MSG. In such scenarios, the network will find the 5G MSG NF, perform the authorization for the UE to utilize the 5G MSG, and provide the 5G MSG information to UE 200. The provision could be done through registration update process, or UE configuration update procedure.

Method of Group Message Delivery in 5G Message Service

Group message delivery enables a UE 200 sending a message to other UEs in a group. The group could be a device group consisting of a set of UEs or an application layer group which contains a group of UEs that are running the same application. In addition, an application server may also send a message to a group of UEs.

Figure 15:
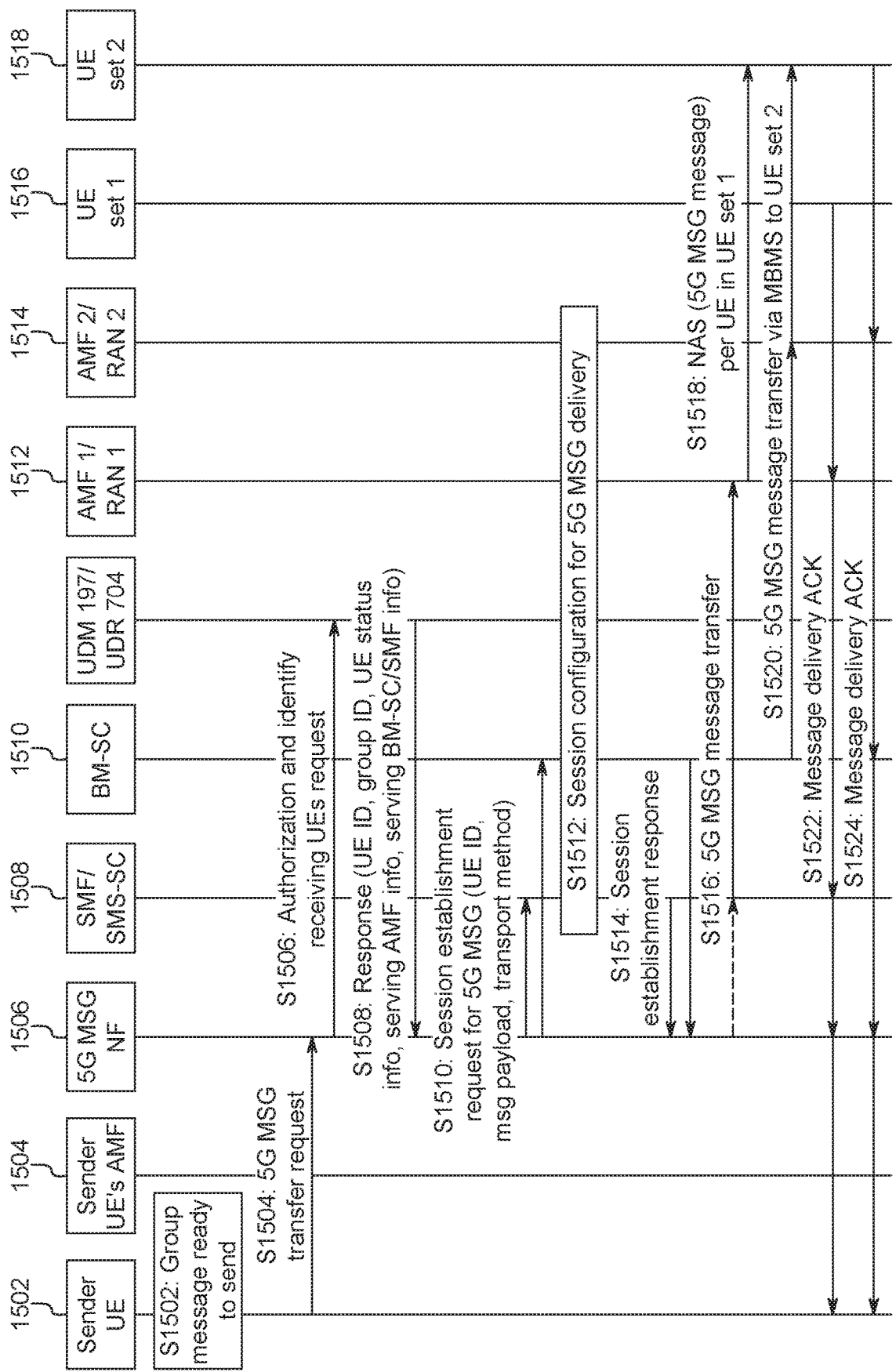
FIG. 15 shows a procedure of group message delivery in 5G MSG from a UE to other UEs in the group.

FIG. 15 shows the method for a UE sending a message to other UEs in a group through the 5G MSG. In step S1502, a group message is generated at the sender UE 1502 by a certain application (e.g., V2X platooning) or a certain network function (e.g., 5G network local warning message). In Step S1504, the sender UE 1502 sends a 5G MSG transfer request to 5G MSG NF 1506. The request message may be carried in a NAS message and forwarded by AMF 1504. If the sender UE 1502 is in CM IDLE state, it can encapsulate the request message in a service request to AMF 1504. The following information may be included in the NAS message: Address of the 5G MSG NF 1506 if it knows such information and Indication that a 5G MSG message is included, or a 5G MSG container is included. The following information may be included in 5G MSG message transfer request:

Type of delivery model is set to group message delivery

Group ID to identify a group of receiving UE. This group ID could the internal group ID or external group ID (e.g., an application layer group). If the group ID is provided, the identifier of each receiver UE is not necessary since the network will figure out each UE ID based on the group ID.

Receiver UE ID(s): in some case, the group is not formed yet before the sender UE decides to initiate a group message delivery. In other words, the sender UE dynamically forms a group for delivering the message. Therefore, it needs to provide ID of each receiver UE. In the case that the UE wants to form a group for the list of Receiver UE IDs, the UE can include a Group ID with the request to indicate to the 5G MSG NF to create a group with the associated Receiver UE IDs. The 5G MSG NF can process the request to send the message and also create the group at the same time for future use by the UE. With respect to the group ID, it is either an indicator from UE to request a new group, or an ID that UE assigns for the new group. Network may use it or generate a new group ID. In other cases, the UE may not need to know either Group IDs or UE IDs (e.g. for privacy reasons), and only 5G MSG NF 1506 may be able to form or dissolve a group. 5G MSG NF 1506 may be responsible for identifying the target UEs to form groups based on some attributes representing the type of data. Hence, 5G MSG NF 1506 may be responsible for broadcast or target UE's subscription of such attributes, data or information with 5G MSG NF 1506.

Preferred transport method indicates the way the UE wants to send the group message to every UE in the group. In this example, the SMS over NAS, user plane and multicast/broadcast function are used to send group message to UEs in the group. Other possible transport protocol may be NIDD over control plane and traditional SMS system.

Acknowledgement requirement: indicates what level of acknowledgement is required. For example, acknowledgement is required from the receiver UE in the group to confirm the successful reception of the message by all UEs in the group or required only from the 5G MSG NF 1506 or SMS-SC 1508 to confirm that the receiver UE's serving NF successfully received the message.

Network area information indicates that the message is sent to the UE in the group that are within the network area.

Step S1506: upon receiving the request message originated from UE 1502 and forwarded by AMF, the 5G MSG NF 1506 contacts UDM 197/UDR 704 to get authorization that the sender UE 1502 is allowed to use 5G MSG to send group message, and convert the group ID to receiver UE ID(s). In addition, 5G MSG NF 1506 requests the information of serving SMF, BM-SC, SMSF or 5G MSG NF for the UEs in the group based on the preferred transport protocol provided by the sender UE 1502. If the sender UE 1502 does not specify such information, a default transport method will be used.

Step S1508: UDM 197/UDR 704 returns the response to 5G MSG NF 1506 with the following information:

Indicate whether the sender UE 1502 is authorized to send a group message to a group of UEs Identifier of each UE included in the group and the UE status information, such as reachability status of a UE, the location of the UE in terms of tracking area, serving AMF, or geographic area.

Based on the preferred transport protocol, the corresponding serving network entity information will be provided. For example, as shown in FIG. 15, the message will be delivered via SMS over NAS to a sub-group of UE (e.g., UE set 1 1516, UE set 2 1518), while the broadcast/multicast functionality will be used to send the message to the rest of UEs in the group. Therefore, the UDM 197/UDR 704 will provide address of SMSF and BM-SC 1510 for those UEs in the group.

In step S1510, with the information from UDM 197/UDR 704, 5G MSG NF 1506 serving the sender UE 1502 will send the request to the corresponding network entities (SMSF and BM-SC in this example) to set up the session for the group message delivery. The message to be delivered may be inserted as payload in the request. 5G MSG NF 1502 provides the sender UE ID as source of the message, group ID or UE IDs, type of message delivery model is set to group message, the level of acknowledgement requirement in the request. In Step S1512, after receiving the 5G MSG group message request, the corresponding network entity initiates the session establishment procedure. In this example, SMSF/SMS-SC 1508 initiates the process to setup connection to send the group message to each UE in the UE set 1 1516 individually. BM-SC 1510 sets up the broadcast/multicast session to send the group message to UEs in UE set 2 1518. In Step S1514, once the connection is configured, SMSF/SMS-SC 1508 and BM-SC 1510 send their response to the 5G MSG NF 1506. In Step S1516: SMSF/SMS-SC 1508 sends the message to AMF1 1512 which serves the UEs in UE set 1 1516 in a NAS message. Note that this is done per UE. In other words, there is a NAS message containing the same group message to each UE in UE set 1 1516. In the message, the sender UE ID will be included, and the level of acknowledgement requirement is included. In Step S1518, AMF1 and RAN node 1 1512 forward the message to each UE. In Step S1520, BM-SC 1510 sends the group message to UE set 2 1518 through the broadcast/multicast session, where it indicates the group ID and the level of acknowledgement requirement. In Steps S1522 and S1524: receiver UEs send back the acknowledgement to confirm that the group message has been successfully delivered, and 5G MSG NF 1506 forwards the ACK to sender UE 1502 once it gets ACK from BM-SC 1510 and/or SMSF/SMS-SC 1508. If the UE 1502 had requested that a group be created, the 5G MSG NF 1506 also returns a Group ID to associate with the group of Receiver UE IDs. The Group ID may be the one provided by the UE or another ID the 5G MSG NF 1506 provides. Alternatively, if there are a large number of UEs in the group, it is not efficient for the sender UE 1502 waiting for the ACK from each of UEs in the group. In this scenario, the network entity (i.e., SMSF/SMS-SC 1508 and BM-SC 1510 in this case) will be responsible for collecting the ACK and retransmission if ACK is not received.

Note that the 5G MSG NF 1506 shown in the FIG. 15 could be 5G_MSGF, 5G_MSG_GW, SMSF, SMS-SC, or a part/combination of those network entities. Note that, in order to enable the interworking among different message systems, e.g., 5G MSG enabled UE sends/receives message to/from a traditional SMS enabled UE, it is proposed that a NF with co-existing of 5G MSG NF functionality and SMS-SC functionality to enable the interworking. For the interworking between 3GPP message system and a non-3GPP message system, 5G MSG NF 1506 will contact the NRF and/or UDM 197/UDR 704 to obtain the address of the non-3GPP message server or an application server for translation (both as an external application server) to enable the interworking.

Figure 16:
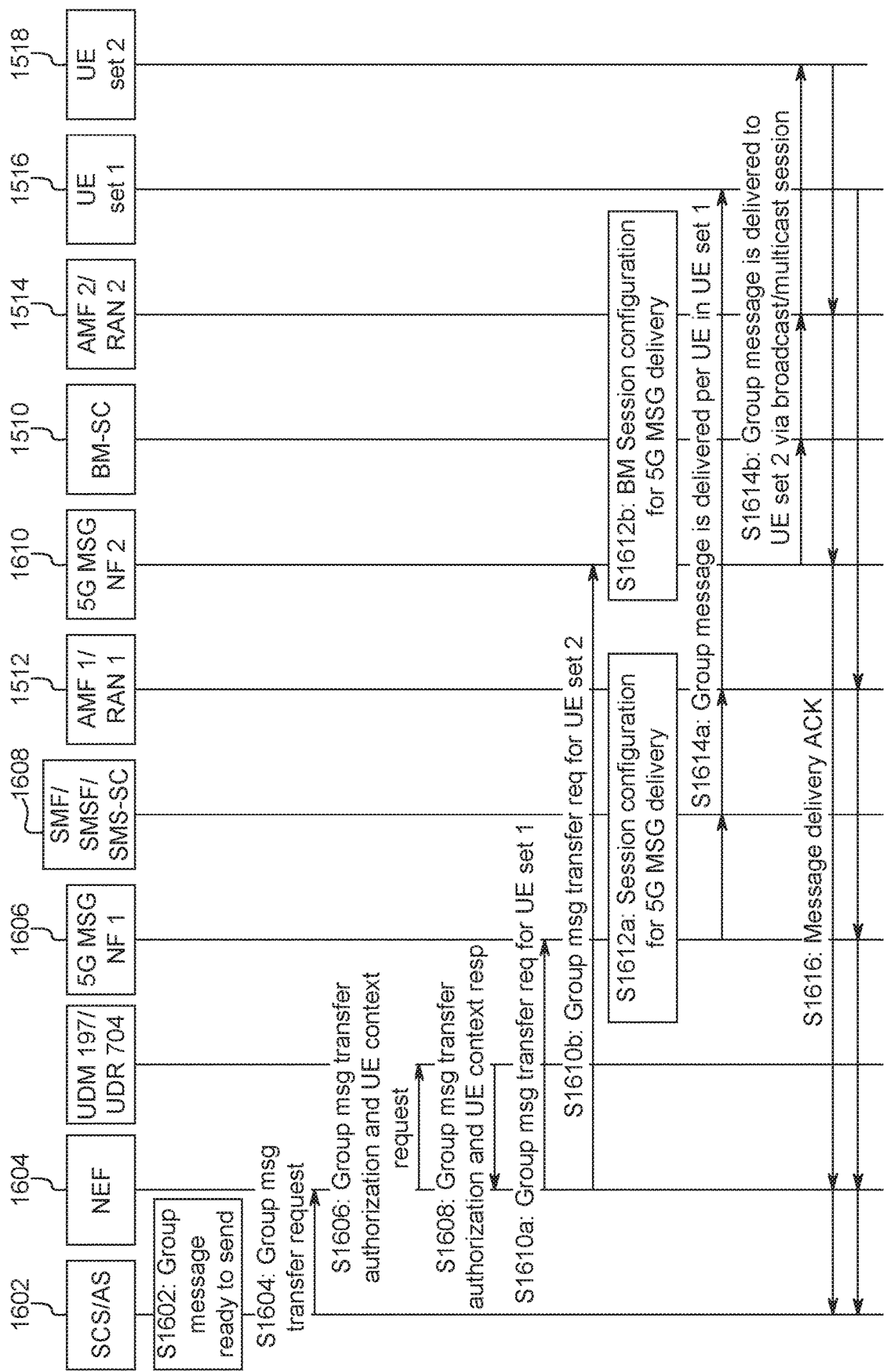
FIG. 16 shows a procedure of group message delivery in 5G MSG from a SCS/AS to a group of UEs.

FIG. 16 shows how an application server sends a message to a group of UEs using 5G MSG. In Step S1602, a group message is generated at SCS/AS 1602 for a certain application (e.g., V2X platooning or local advertisement). In Step S1604: SCS/AS 1602 sends the group message transfer request to NEF 1604, where the following information is included:

Address, or identity, of the 5G MSG NF. In order to use the 5G MSG, SCS/AS 1602 is supposed to have some information about 5G MSG NF through pre-configuration or communication with network.

Type of delivery model is set to group message delivery

Group ID to identify a group of receiving UEs. This group ID could be the internal group ID and external group ID (e.g., an application layer group). If the group ID is provided, the identifier of each receiver UE is not necessary since the NEF 1604 will figure out each UE ID based on the group ID.

Receiver UE ID(s): in some case, the group is not formed yet before the SCS/AS 1602 decides to initiate a group message delivery. In other words, the group is dynamically formed only for delivering one group message. Therefore, it needs to provide ID of each receiver UE. In the case that the UE wants to form a group for the list of Receiver UE IDs, the UE can include a Group ID with the request to indicate to the 5G MSG NF to create a group with the associated Receiver UE IDs. The 5G MSG NF can process the request to send the message and also create the group at the same time for future use by the UE. With respect to the group ID, it is either an indicator from UE to request a new group, or an ID that UE assigns for the new group. Network may use it or generate a new group ID. In other cases, the UE may not need to know either Group IDs or UE IDs (e.g. for privacy reasons), and only 5G MSG NF may be able to form or dissolve a group. 5G MSG NF may be responsible for identifying the target UEs to form groups based on some attributes representing the type of data. Hence, 5G MSG NF may be responsible for broadcast or target UE's subscription of such attributes, data or information with 5G MSG NF.

Preferred transport method indicates the way SCS/AS 1602 wants to use to send the group message to every UE in the group. In this example, the SMS over NAS, user plane and multicast/broadcast function are used to send group message to UEs in the group. Other possible transport protocol may be NIDD over control plane and traditional SMS system.

Acknowledgement requirement: indicate what level of acknowledgement is required. For example, acknowledgement is required from the receiver UE in the group to confirm the successful reception of the message by all UEs in the group or required only from the 5G MSG NF or SMS-SC to confirm that the receiver UE's serving NF successfully receiving the message.

Network area information indicates that the message is sent to UEs in the group that are within the network area.

SCS/AS ID and message reference ID

Optionally, the SCS/AS may append the message to be delivered as payload in the request.

In step S1606, NEF 1604 sends request to UDM 197/UDR 704 to verify whether the SCS/AS 1602 is authorized for sending group message using 5G MSG, and also requests UE context for UEs that are in the group. The example UE context information could be UE reachability status, UE location, UE IDs, information of 5G MSG NF/SMSF/SMS-SC/BM-SC/SMF that are serving the UEs in the group depending on which transport protocol will be used for the group message delivery, serving AMF information. In Step S1608, UDM 197/UDR 704 returns the response with all the information SCS/AS 1602 requests in step S1606. In Steps S1610*a* and S1610*b*: with the serving 5G MSG NF information, NEF 1604 sends the group message transfer request along with the message to 5G MSG NF1 1606 and 5G MSG NF2 1610 respectively. It is assumed here that the group of UEs can be divided into UE set 1 1516 and UE set 2 1518. 5G MSG NF1 1606 serves UEs in set 1 1516, and SMS over NAS will be used to deliver the message to UEs in set 1. 5G MSG NF2 1610 serves UEs in set 2 1518, and broadcast/multicast functionality will be used to deliver the message to UEs in set 2 1518. In Steps S1612*a* and S1612*b*: SMSF and BM-SC initiates the session configuration process to prepare for the message delivery respectively. In Step S1614*a*, after connection is created, 5G MSG NF1 1606 sends message to SMSF or SMS-SC 1608, which further forward the message to UEs in set 1 1516. Note that this is performed on a per UE base, i.e., each UE in set 1 will receive the message through its own NAS connection via AMF1 1512. In Step S1614*b*, 5G MSG NF2 1610 sends message to BM-SC 1510, which further forward the message to UEs in set 2 1518 through the broadcast and multicast session it established before. In order to receive the traffic transferred through the MBMS session, each UE in UE set 2 1518 will be notified by network that a MBMS session is established, and the UE should listen to the traffic transferred over that session. This could be done by UE configuration update process, or as a part of network-initiated session establishment/modification process. Alternatively, the UEs in the group may get group related information from SCS/AS through over-the-top procedure. That implies that, once the MBMS session is established in step S1612*b*, SCS/AS will be notified by the BM-SC 1510 or 5G MSG NF2 1610 via NEF 1604. In Step S1616, UE returns the ACK to confirm the successful delivery to 5G MSF NF and SCS/AS accordingly. Alternatively, if there are a large number of UEs in the group, it is not efficient for the sender UE waiting for the ACK from each of UEs in the group. In this scenario, the network entity (i.e., SMF/SMSF/SMS-SC and BM-SC in this case) will be responsible for collecting the ACK and retransmission if ACK is not received. In such scenario, retransmission will be per UE based, implying that the message will be re-transmitted to the UE that does not return ACK. If the UE had requested that a group be created, the 5G MSG NF also returns a Group ID to associate with the group of Receiver UE IDs. The Group ID may be the one provided by the UE or another ID the 5G MSG NF provides.

Methods of Managing Subscription and Notification in 5G MSG

A message service is expected to provide subscription and notification functionality. This section provides more detailed procedures on how to implement the related functionalities in 5G MSG, including how an entity (i.e., UE, NF or AS) subscribes to certain types of messages, and gets a notification when the message is available, and how an entity (i.e., UE, NF or AS) publishes information to 5G MSG system.

Figure 17:
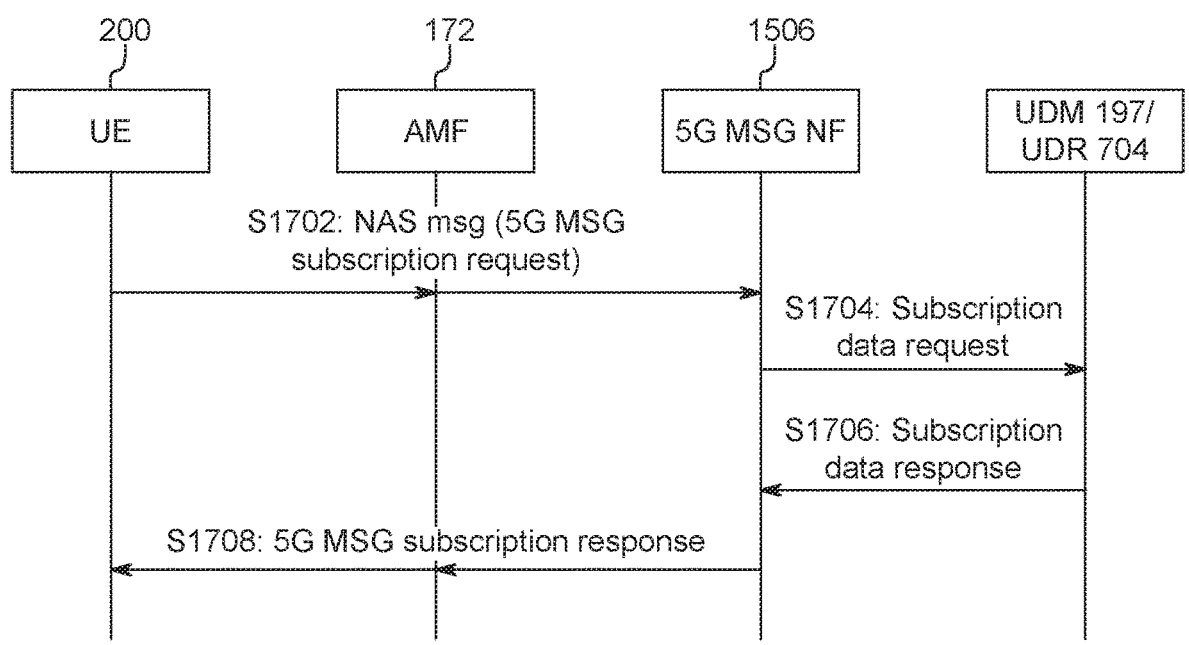
FIG. 17 shows a procedure of managing subscription in 5G MSG from a UE.

FIG. 17 shows the procedure of subscribing to different events or message types in 5G MSG for a UE 200. In step S1702: a UE 200 sends 5G MSG subscription request to AMF 172, which is forwarded to the serving 5G MSG NF 1506. The request message could be included in a NAS message. In the request message, UE 200 will include address of its serving 5G MSG NF 1506, so that AMF 172 knows where to forward the request. In addition, the following information will be included:

Subscription request message ID: used as a reference during the subscription/notification process. Subscriber (i.e., UE) will generate this ID to make sure that it is unique per UE within the 5G MSG subscription/notification process. 5G MSG NF 1506 will use this ID along with UE ID to identify the notification target.

Identifier assigned to UE 200 for using 5G MSG and UE ID (e.g., 5G-GUTI, SUPI) assigned during registration Subscribed event type and/or message type: indicate what type of event or type of message the UE subscribes to. For example, the event could be warning message within a local area, a message that describes a critical network congestion occurs preventing some network service, a message that indicates that a specific application server starts closer to the UE 200. The UE 200 needs to indicate the event ID along with some filter information, such as time window, area information and UE status restriction. In addition, UE 200 may indicate if it subscribed to event/message must be generated by a certain entity (e.g. a particular UE, a particular AS, a type of NF, etc.). For example, the congested message could be generated by AMF, SMF, and a UE which experiences a network performance degradation. The subscribing UE can indicate that it only wants the congestion message generated by an NF.

Preferred transport protocol for transferring notification. For example, UE 200 may indicate SMS over NAS, NIDD over CP or traditional SMS system for text message deliver. Moreover, for each transport method, UE 200 will provide the contact address information, e.g., for SMS-SC for traditional SMS system, SMSF address or ID for SMS over NAS.

Notification destination: indicate to 5G MSG NF where to send the notification. This could be in the form of one or multiple UE IDs (e.g., could be some remote UEs that connect to network via a relay UE), a SCS/AS ID, a user ID (e.g., assume multiple users share a mobile device) or a group ID. Moreover, the notification target could be an application running on the UE 200. In such case, the destination could be the application ID plus the port number that assigned to the application.

Restricted conditions for notification: indicate certain conditions in which the notification will or will not be transferred. For example, UE 200 is roaming for the event that HPLMN is congested.

Notification schedule that defines time windows of when notifications are to be sent and when the notification should not be sent.

QoS requirement: indicate how fast the UE 200 expects the 5G MSG NF 1506 to send the notification in terms of latency as well as certain priority level of the message (e.g., High, Med, Low).

In Step S1704: 5G MSG NF 1506 requests authorization and UE context from UDM 197/UDR 704 once it receives the subscription request. In Step S1706: UDM 197/UDR 704 returns the requested information to 5G MSG NF 1506. In Step S1708: 5G MSF NF 1506 processes the subscription request, and sends a response to UE 200 with the subscription ID.

Figure 18:
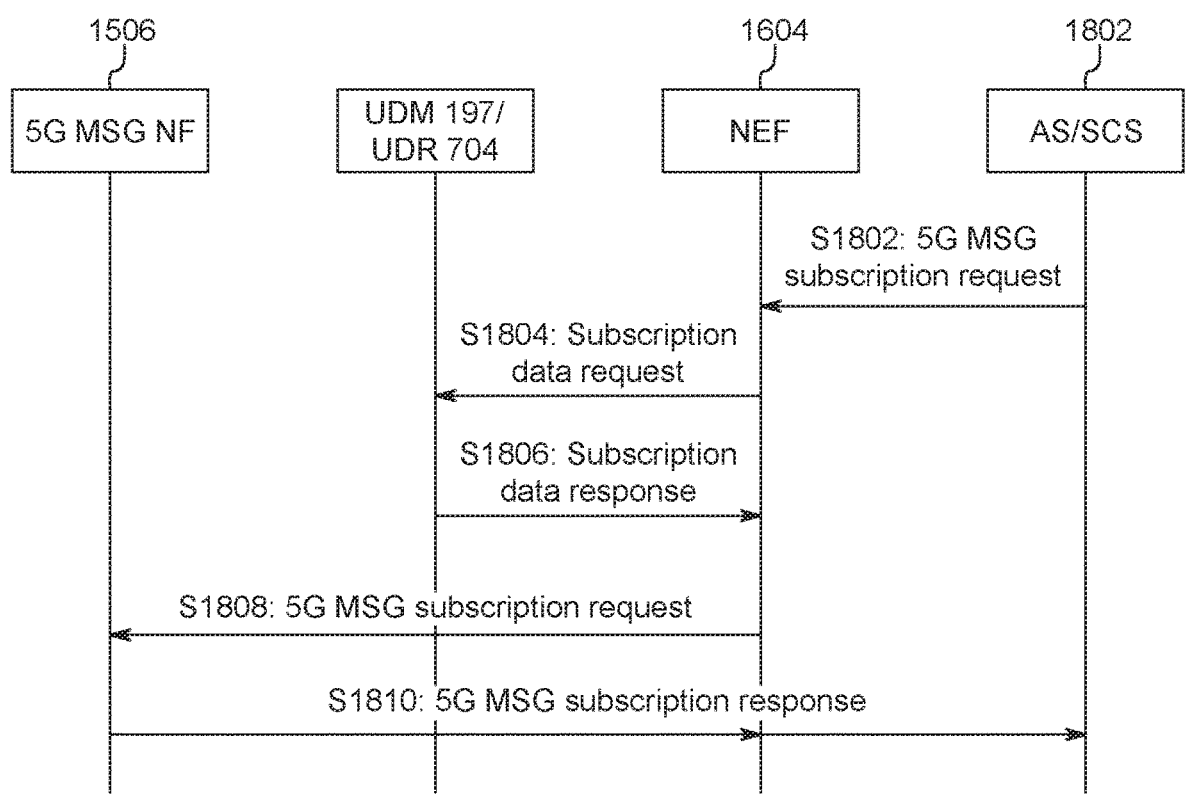

FIG. 18 shows the procedure of subscribing to different events or message types in 5G MSG for a SCS/AS. In Step S1802: SCS/AS 1802 sends a 5G MSG subscription request to NEF 1604, where it includes the following information:

5G MSG NF ID
Subscription request message ID:
Identifier assigned to SCS/AS 1802 for using 5G MSG and SCS/AS ID that are used in 5GC
Subscribed event type and/or message type
Preferred transport protocol for notification
Notification destination:
Restricted conditions for notification
QoS requirement In Step S1804, NEF 1604 sends request to UDM 197/UDR 704 about whether SCS/AS 1802 is authorized to subscribe to 5G MSG, and the information of the serving 5G MSG NF 1506 if SCS/AS 1802 does not provide such information. In Step S1806: UDM 197/UDR 704 returns the requested information to NEF 1604. In Step S1808: if SCS/AS 1802 is authorized, NEF 1604 forwards a subscription request to 5G MSF NF 1506 with an indication that UDM 197/UDR 704 authorized the subscription. In Step S1810: 5G MSF NF 1506 processes the subscription request and sends a response to SCS/AS 1802 with the subscription ID via NEF 1604.

Figure 19:
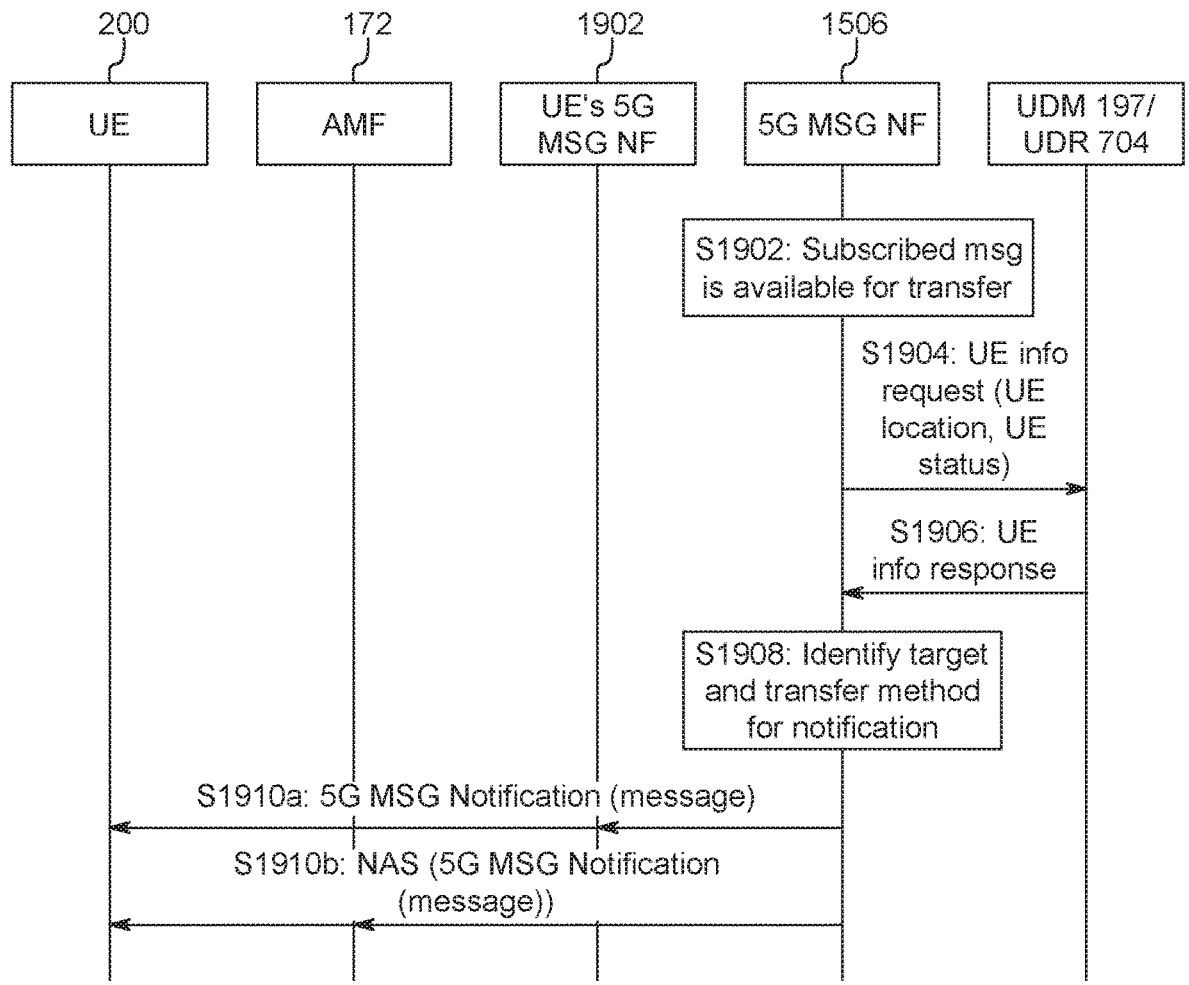
FIG. 19 shows a procedure of sending 5G MSG notification to a UE.

FIG. 19 presents the procedure on how the notification is sent to UE 200 when the subscribed event/message occurs. In Step S1902: the subscribed event/message occurs, and the notification is ready to be sent. It is assumed that all the conditions are met as listed in the restricted conditions for notification in the subscription request message, as well as the filter information provided by the subscriber (i.e., UE 200 or SCS/AS 1802). In Step S1904: 5G MSF NF 1506 sends request to UDM 197/UDR 704 to get information about subscriber information, such as UE status (e.g., CM IDLE), UE location, serving 5G MSF NF 1506 and address(es). There could be more than one subscriber which the notification will be sent to. In this case, 5G MSG NF 1506 will request information of each subscriber. In Step S1906: UDM 197/UDR 704 returns the information that are requested in step S1904. In Step S1908: 5G MSG NF 1506 identifies the notification destination and transport protocol based on subscription ID and subscriber information. In Step S1910a: in case that the notification destination is a UE or a group of UEs, and they are served by a different 5G MSG NF 1902, the current 5G MSF NF 1902 sends notification to the serving 5G MSF NF 1506, which then delivers the notification to the target UEs. The transport protocol could be broadcast/multicast, SMS over NAS, NIDD over control plane or user plane connection. In the notification message, the 5G MSG NF 1506 will include the subscription ID assigned by UE 200 when it requests to subscribe to the event/message. Moreover, network may also indicate the new types of events and/or messages that can be subscribed to. Note that user plane connection is not shown in the figure; in that case, the 5G MSG NF 1506 may forward the notification through an SMF/UPF to be delivered to the UE 200. In Step S910b: for those target UEs that are served by the current 5G MSG NF 1902, the notification is sent to those UEs. Different transport protocols may be used based on the subscription information.

Figure 20:
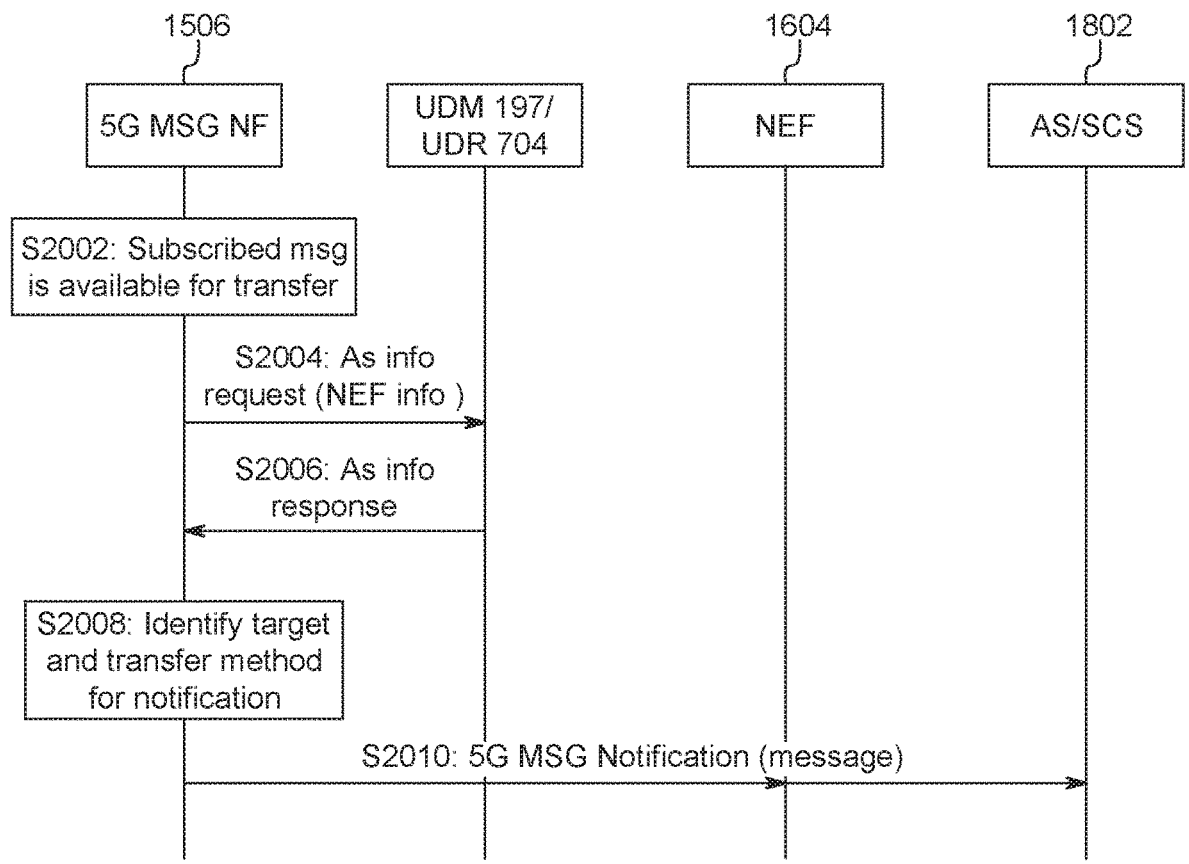

FIG. 20 shows the procedure on how the notification is sent to SCS/AS 1802. In step S2002, a subscribed MSG is available for transfer. In steps S2004 and S2006, 5G MSG NF 1506 will communicate with UDM 197/UDR 704 to obtain the serving NEF information, so that it is able to forward the notification to the serving NEF 1604.

Figure 21:
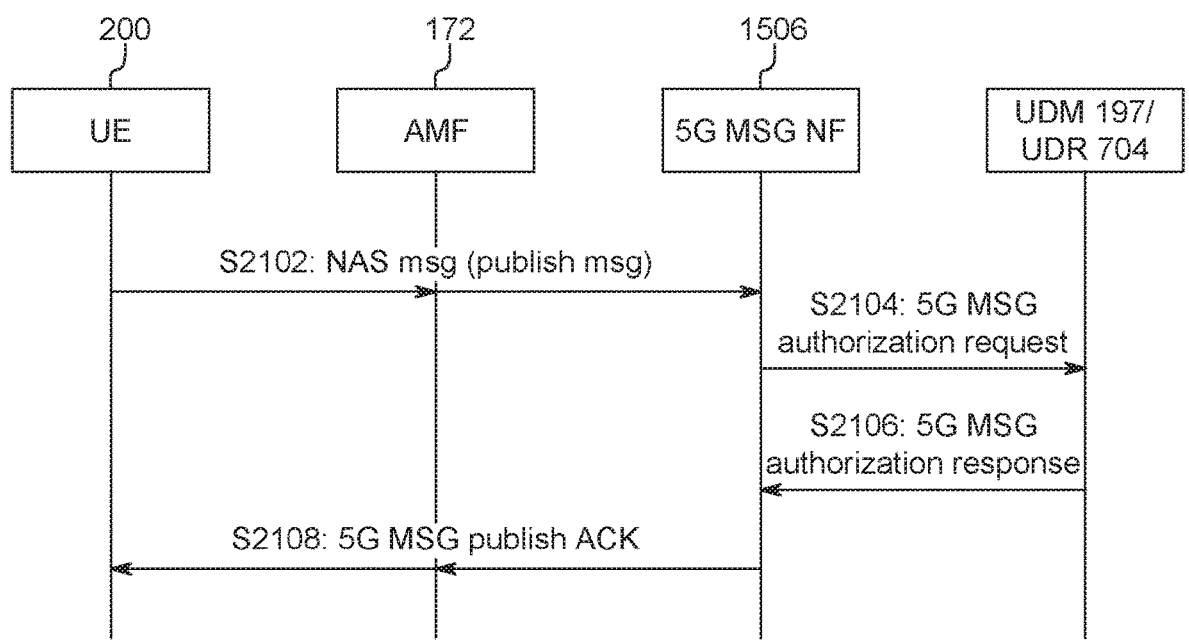
FIG. 21 shows a procedure of publishing message in 5G MSG from a UE.

It is mentioned that the subscription/notification mechanism in the 5G MSG NF 1506 may send a notification about the external event/message that are provided by a UE 200 and/or SCS/AS 1802. For example, a new edge server is available for V2X application close to a UE 200. In step S2010, the 5G MSG NF 1506 sends a 5G MSG Notification (message) to the SCS/AS 1802. This section proposes the idea on how UE 200 and SCS/AS 1802 publish some information to trigger 5G MSG NF 1506 sending notification, shown as FIG. 21 and FIG. 22, respectively. In step S2102 of FIG. 21, UE 200 sends a message to 5G MSG NF 1506 to indicate that it is publishing certain information that may be interesting to some subscriber. There could be multiple cases that trigger the UE 200 to publish a message, for example, the application server wants to promote its application service within an area, a UE 200 is asked by 5G MSG NF 1506 for providing certain group information or network performance when it communicates with 5G MSG NF 1506. The publish message may include the following information:

The source of the message, such as UE ID, and ID assigned for using 5G MSG system.
Event ID or message type
Some attributes associated with the published event/message, such as time stamp, location information, application service information.
Payload associated with the event or message type In Step S2104, 5G MSF NF 1506 requests UDM 197/UDR 704 for the authorization on whether UE 200 is allowed to publish certain information to 5G MSG. In Step S2106, UDM 197/UDR 704 sends response after checking the subscription data, UE context as well as 5G MSG registration information for UE 200. In Step 4S2108 5G MSG NF 1506 returns ACK to UE 200 to confirm that it successfully receives the published message.

Figure 22:
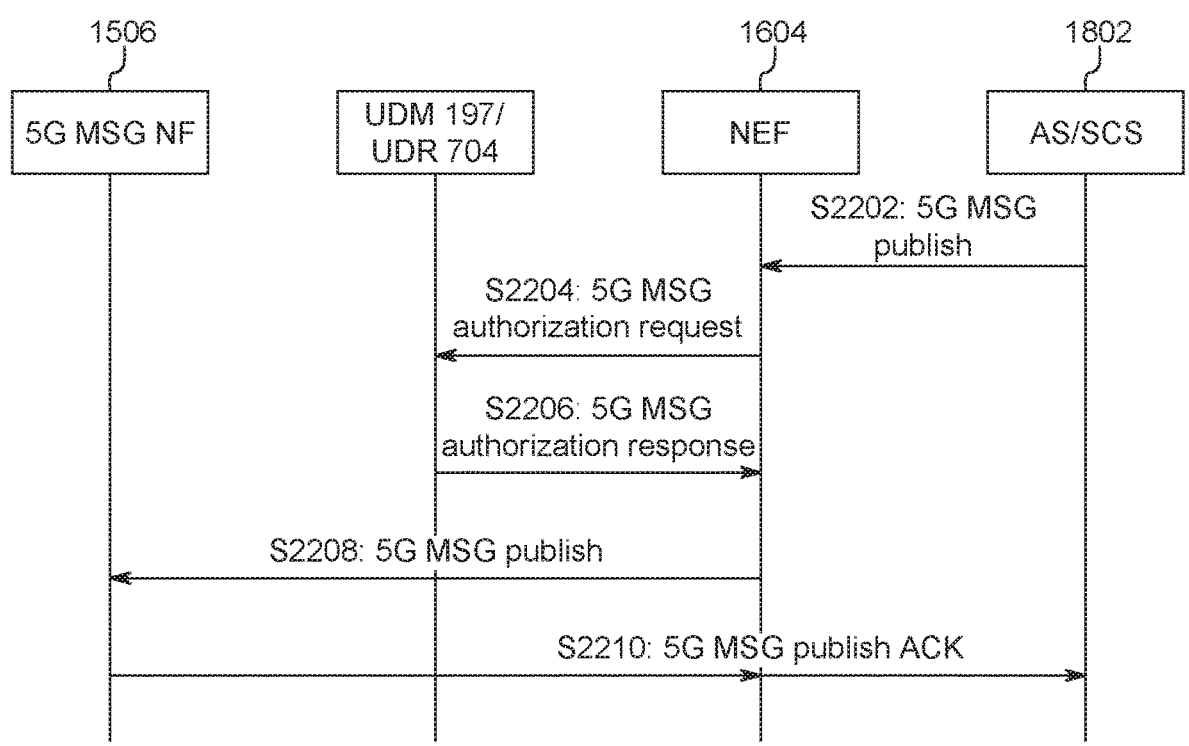

FIG. 22 shows the procedure on how an SCS/AS 1802 publishes certain information to 5G MSG system. In Step S2202, the SCS/AS 1802 send the 5G MSG publish message to NEF 1604, which indicates that the SCS/AS 1802 wants to publish information and includes the information such as the type of event/message, event ID, SCS/AS ID. In Steps S2204 and S2206, NEF 1604 communicates with UDM 197/UDR 704 to authorize that the SCS/AS 1802 is allowed to publish information to 5G MSG system. In Step S2208, NEF 1604 forwards the publish message to 5G MSG NF 1506, which replies with ACK message to the SCS/AS 1802 in Step S2210 via NEF 1604.

Figure 23:
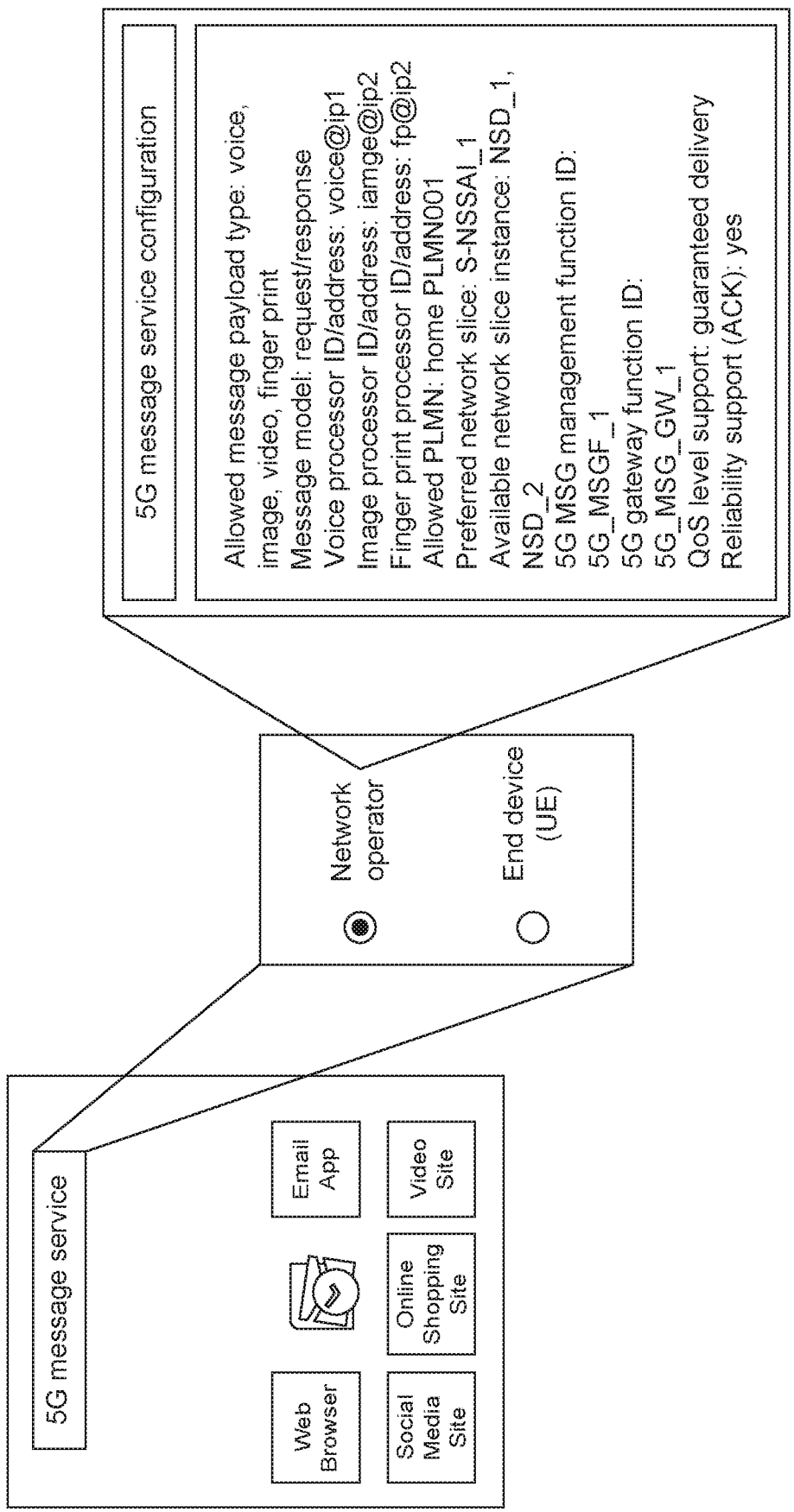
FIG. 23 shows an exemplary user interface for configuring a 5G message service in a 5G network.

FIG. 23 shows an exemplary user interface for configuring the 5G message service in a 5G network. The user interface could be used by the UE, as well as the network operator.

An exemplary embodiment of the present disclosure provides a first apparatus (e.g., 102) that includes a processor (e.g., processor 118), a memory (e.g., memory 130, memory 132, etc.), and communication circuitry (which can include e.g., transceiver 120). The first apparatus is connected to a communications network via its communication circuitry. The first apparatus further includes computer-executable instructions stored in the memory of the first apparatus which, when executed by the processor of the first apparatus, cause the first apparatus to: receive voice content or other biometric content of a user (e.g., fingerprint, retinal scan, etc.); prepare a message including the voice or other biometric content; and send the message to a network or a second apparatus through a control plane of the communications network in order to authenticate and authorize the first apparatus and the user.

In an exemplary embodiment, the message is sent through the control plane to also authenticate the user. That is, the message is used to authenticate the first apparatus, and optionally also, the user. In an exemplary embodiment, an application server AS or a voice processing server is configured to perform the authentication of the user, and the authentication of the user includes at least one of: confirming that the user that has inputted the voice content is the user they claim to be; and when the voice content is a voice command, the user that has inputted the voice command has rights to request an operation indicated in the voice command. See FIGS. 6, 10, and 13. In an exemplary embodiment it is described that an application server or a voice processing server can perform the authentication of the user, but any device can perform the authentication of the user. In an exemplary embodiment, the message is transferred using a message service.

In an exemplary embodiment, the control plane is a Non Access Stratum (NAS) transport. For example, as seen in FIG. 8, the NAS can be a NAS-MM. A NAS is a specific type of control plane. However, any control plane could be used. It is advantageous to send the message via a 5G core network instead of an IP-based network (e.g., the Internet) for several reasons. For example, it is more efficient to send the message via the 5G core network, because the network already has stored information regarding the user (e.g., user's name, information on the UE (UE ID number, model number, etc.), information on other devices of the user, etc.). Also, it is advantageous for a network operator to be involved in the sending of the message over the network, so they can charge their subscribers for this service.

In an exemplary embodiment, the control plane is in a 5G core network. For example, the core network can be the core network 106/107/109 shown in FIG. 1A, the core network 106 shown in FIG. 1C, the core network 107 shown in FIG. 1D, the core network 109 etc.

In an exemplary embodiment, wherein the voice content is a voice command to actuate a device or service. For example, the voice commands can be those shown in FIG. 6.

In an exemplary embodiment, message subscription and distribution are done through the control plane NAS connection via an Access and Mobility Management Function (AMF). See FIG. 8.

In an exemplary embodiment, the message includes one or more of: a message ID (e.g., 5G MSG ID), a message reference ID (e.g., 5G MSG reference ID), a message type (e.g., 5G MSG message type), a voice processor ID, a user ID, application information, a message management function ID (e.g., ID of 5G MSGF), and a message gateway function ID (e.g., ID of 5G_MSG_GW).

In an exemplary embodiment, the first apparatus is a user equipment (e.g., a smartphone, etc.). In an exemplary embodiment, the message is a request message that includes a voice command.

An exemplary embodiment of the present disclosure provides a first apparatus (e.g., 102, UE 200, SCS/AS 1602, etc.) that includes a processor (e.g., processor 118), a memory (e.g., memory 130, memory 132, etc.), and communication circuitry (which can include e.g., transceiver 120). The first apparatus is connected to a communications network via its communication circuitry. The first apparatus further includes computer-executable instructions stored in the memory of the first apparatus which, when executed by the processor of the first apparatus, cause the first apparatus to: receive voice content or other biometric content of a user; prepare a message including the voice or other biometric content; send the message to the communications network or a second apparatus through a control plane of the communications network in order to authenticate and authorize the first apparatus and the user; and receive a response message from the communications network or the second apparatus. The response message includes authentication and authorization results for the first apparatus and identification information that identifies the user.

In an exemplary embodiment, the first apparatus is configured to: send a 5G message service request to the communications network, wherein the 5G message service request includes another voice or biometric content from the identified user, and wherein the 5G message service request triggers a secondary (re-)authentication and (re-)authorization process, and triggers delivery of a 5G message service message via the communications network; and receive a response from the communications network. See, e.g., FIG. 14 and the associated description.

In an exemplary embodiment, the 5G message service request allows the first apparatus to discover whether a 5G message service is available in the communications network or the 5G message service request causes the first apparatus to be authorized to use a 5G message service.

In an exemplary embodiment, an application server or a voice processing server (e.g., SCS/AS 1602) is configured to perform the authentication of the user, and the authentication of the user includes at least one of: confirming that the user that has inputted the voice content is the user they claim to be; and when the voice content is a voice command, the user that has inputted the voice command has rights to request an operation indicated in the voice command. In an exemplary embodiment, the message is transferred using a message service. In an exemplary embodiment, the control plane is a Non Access Stratum (NAS) transport. In an exemplary embodiment, the voice content is a voice command to actuate a device or service. In an exemplary embodiment, message subscription and distribution are done through the control plane NAS connection via an Access and Mobility Management Function (AMF) (e.g., AMF 172). In an exemplary embodiment, the message includes one or more of: a message ID, a message reference ID, a message type, a voice processor ID, a user ID, application information, a message management function ID, and a message gateway function ID. In an exemplary embodiment, the first apparatus is a user equipment.

An exemplary embodiment of the present disclosure provides a first apparatus (e.g., 102, UE 200, SCS/AS 1602, etc.) that includes a processor (e.g., processor 118), a memory (e.g., memory 130, memory 132, etc.), and communication circuitry (which can include e.g., transceiver 120). The first apparatus is connected to a communications network via its communication circuitry. The first apparatus further includes computer-executable instructions stored in the memory of the first apparatus which, when executed by the processor of the first apparatus, cause the first apparatus to: generate a message to be sent to a group of second apparatuses; send a group message delivery request to a 5G message service (e.g., 5G MSG NF) on the communications network, wherein the group message delivery request includes a preferred transport method for sending the group message to the group of second apparatuses and the group message delivery request indicates what level of acknowledgment is required; and receive, if acknowledgement is required, an acknowledgment (ACK) signal from the 5G message service.

In an exemplary embodiment, the group message delivery request includes one or more of: address of the 5G message service entity, indication that a message is included in the group message delivery request, a group ID identifying the group of second apparatuses, and one or more IDs of second apparatuses in the group of second apparatuses.

In an exemplary embodiment, the 5G message service (e.g., 5G MSG NF) that receives the group message delivery request is configured to do one or more of the following: retrieve subscription information, identify the second apparatuses in the group and location and network status of each of the second apparatuses in the group, identify one or more network functions that are serving the group of second apparatuses, and trigger a session establishment procedure for delivery of the group message according to the preferred transport method.

In an exemplary embodiment, the first apparatus is a user equipment (e.g., UE 200) or an application server (e.g., SCS/AS 1602).

In an exemplary embodiment, the 5G message service is a 5G message network function (e.g., 5G MSG NF).

An exemplary embodiment of the present disclosure provides a first apparatus (102, UE 200, SCS/AS 1602, etc.) that includes a processor (e.g., processor 118), a memory (e.g., memory 130, memory 132, etc.), and communication circuitry (which can include e.g., transceiver 120). The first apparatus is connected to a communications network via its communication circuitry. The first apparatus further includes computer-executable instructions stored in the memory of the first apparatus which, when executed by the processor of the first apparatus, cause the first apparatus to: send a subscription request message to a 5G message service (e.g. 5G MSG NF) (see e.g., step S1702), wherein the subscription request message is a request to subscribe to a particular event or message; receive a response acknowledging that the subscription has been successful from a network entity; and receive a notification from the 5G message service that the particular event or message that is subscribed to has occurred (e.g., step S1708).

In an exemplary embodiment, the subscription request message includes one or more of: address of 5G message service that is serving the first apparatus, a subscription request message ID, an identifier assigned to the first apparatus during registration, type of the particular event or message, preferred transport protocol for transfer of the notification, notification destination, restricted conditions for notification, notification time schedule, and quality of service requirement for the subscription request message.

In an exemplary embodiment, the notification is sent by Short Message Service (SMS) over Non Access Stratum (NAS), traditional SMS, Non-IP Data Delivery (NIDD), traditional user plane path, or Multimedia Broadcast Multicast Service (MBMS).

In an exemplary embodiment, the first apparatus is a user equipment or an Application Server (AS). In an exemplary embodiment, the first apparatus publishes information to the 5G message service (e.g. 5G MSG NF 1506).

In an exemplary embodiment, after the 5G message service entity (e.g., 5G MSG NF 1506) receives the subscription request message (S1702), the 5G message service entity (e.g., 5G MSG NF 1506) requests authorization and context of the first apparatus (e.g., UE 200) from a Unified Data Management (UDM) 197 or Unified Data Repository (UDR) 704, the 5G message service entity (e.g., 5G MSG NF 1506) receives the authorization and the context of the first apparatus (e.g., UE 200) that was requested, and the 5G message service entity (e.g., 5G MSG NF 1506) sends a subscription ID to the first apparatus (e.g., UE 200). The 5G message service entity (e.g., 5G MSG NF 1506) requests a location and status of the first apparatus from the UDM 197 or UDR 704 (step S1904), receives the location and status of the first apparatus (e.g., UE 200) (step S1906), the 5G message service entity (e.g., 5G MSG NF 1506) identifies a destination of a notification and a transfer method for the notification based at least on the subscription ID (step S1908), and the 5G message service entity sends the notification to the first apparatus (e.g., step S1910a).

An exemplary embodiment of the present disclosure provides a method for performing a message service on a network (e.g., a 5G network), the network including at least a first apparatus that includes a processor, a memory, and communication circuitry. The method includes: receiving, by the first apparatus, voice content or other biometric content of a user; preparing, by the first apparatus, a message including the voice or other biometric content; and sending the message to a second apparatus through a control plane in order to authenticate and authorize the first apparatus and the user.

An exemplary embodiment of the present disclosure provides a non-transitory computer readable storage medium having computer-readable instructions tangibly recorded thereon which, when executed by processing circuitry, cause the processing circuitry to perform a message service method on a network. The method includes: receiving, by a first apparatus, voice content or other biometric content of a user; preparing, by the first apparatus, a message including the voice or other biometric content; and sending the message to a second apparatus through a control plane of the network in order to authenticate and authorize the first apparatus and the user.

An exemplary embodiment of the present disclosure provides a communication system including: a first apparatus as described above; a biometric signature repository (e.g., a server) that stores biometric data associated with a user ID; and a biometric data analyzer configured to analyze the voice content or other biometric content of the user and produce a signature file associated with the voice content or other biometric content, and compare the signature file to the biometric data stored in the biometric signature repository. The biometric data stored in the repository can be a voice signature, a retinal scan, fingerprint information, or any other biometric data.

An exemplary embodiment of the present disclosure provides a second apparatus comprising a processor, a memory, and communication circuitry, the second apparatus being connected to a communications network (e.g., a 5G network) via its communication circuitry, the second apparatus further comprising computer-executable instructions stored in the memory of the second apparatus which, when executed by the processor of the second apparatus, cause the second apparatus to: receive a message, including voice content or other biometric content of a user, from a first apparatus via a control plane; and initiate authentication and authorization of the first apparatus based on the received message.

In an exemplary embodiment, the second apparatus is a 5G core network or is part of a 5G core network.

In an exemplary embodiment, the second apparatus is a gateway (e.g., a gateway device). In an exemplary embodiment, the second apparatus is a message service device provided by a 5G core network.

In an exemplary embodiment, the second apparatus is configured to initiate authentication and authorization of the user based on the message sent via the control plane. In an exemplary embodiment, the control plane is a NAS transport. In an exemplary embodiment, the voice content is a voice command to actuate or authenticate a device or service. In an exemplary embodiment, message subscription and distribution are done through the control plane NAS connection via an AMF. In an exemplary embodiment, the message includes one or more of: a message ID, a message reference ID, a message type, a voice processor ID, a user ID, application information, a message management function ID, and a message gateway function ID.

An exemplary embodiment of the present disclosure provides a method for performing a message service on a network, the network including at least a second apparatus that includes a processor, a memory, and communication circuitry. The method includes: receiving, by the second apparatus, a message including voice content or other biometric content of a user, from a first apparatus via a control plane; and initiating authentication authorization of the first apparatus and the user based on the received message.

An exemplary embodiment of the present disclosure provides a non-transitory computer readable storage medium having computer-readable instructions tangibly recorded thereon which, when executed by processing circuitry, cause the processing circuitry to perform a message service. The method includes: receiving, by the second apparatus, a message including voice content or other biometric content of a user, from a first apparatus via a control plane; and initiating authentication authorization of the first apparatus and the user based on the received message.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

The following [1]-[5] are incorporated by reference:
[1] 3GPP TS 23.682, Architecture enhancements to facilitate communications with packet data networks and applications, v15.1.0.
[2] NGMN Alliance, "Description of Network Slicing Concept," www.ngmn.org/uploads/media/160113_Network_Slicing_v1)0.pdf.
[3] 3GPP TS 23.501, System Architecture for the 5G System; Stage 2, v15.1.0.
[4] 3GPP TS 23.502, Procedures for the 5G System; Stage 2, v15.1.0.
[5] 3GPP TR 22.824, Feasibility study on 5G message service for MIoT; Stage 1 (Release 16), v2.0.0, 2018-09.

What is claimed is:
1. A first apparatus, comprising:
a memory configured to store computer-executable instructions;
communication circuitry configured to connect the first apparatus to a communications network; and a processor configured to execute the computer-executable instructions to cause the first apparatus to:
receive at least one of first voice content or first biometric content of a user;
prepare a message including the at least one of the first voice content or the first biometric content;
send the message to at least one of the communications network or a second apparatus through a control plane of the communications network to authenticate and authorize the first apparatus and the user;
receive a first response message from the at least one of the communications network or the second apparatus, wherein the first response message includes authentication and authorization results for the first apparatus and identification information that identifies the user; and
send a 5G message service request to the communications network based on the identification information that identifies the user, wherein
the 5G message service request includes at least one of second voice content or second biometric content of the identified user,
the second voice content is different from the first voice content, and
the second biometric content is different from the first biometric content.

2. The first apparatus of claim 1, wherein
the 5G message service request triggers a secondary re-authentication and re-authorization process, and triggers delivery of a 5G message service message via the communications network, and
the first apparatus is configured to receive a second response message from the communications network.

3. The first apparatus of claim 2, wherein the 5G message service request one of allows the first apparatus to discover whether a 5G message service is available in the communications network or causes the first apparatus to be authorized to use the 5G message service.

4. The first apparatus of claim 1, wherein
at least one of an application server or a voice processing server performs the authentication of the user, and
the authentication of the user includes confirmation of at least one of:
an identity of the user that has inputted the first voice content; or
in a case where the first voice content is a voice command, the user that has inputted the voice command has rights to request an operation indicated in the voice command.

5. The first apparatus of claim 1, wherein the first apparatus is configured to send the message using a message service.

6. The first apparatus of claim 1, wherein the control plane is a Non Access Stratum (NAS) transport.

7. The first apparatus of claim 1, wherein the first voice content is a voice command to actuate one of a device or a service.

8. The first apparatus of claim 1, wherein the first apparatus is configured to subscribe to and distribute the message through a NAS connection of the control plane via an Access and Mobility Management Function (AMF).

9. The first apparatus of claim 1, wherein the message includes at least one of a message ID, a message reference ID, a message type, a voice processor ID, a user ID, application information, a message management function ID, or a message gateway function ID.

10. The first apparatus of claim 1, wherein the first apparatus is a user equipment.

* * * * *